(12) United States Patent
Gregg, III

(10) Patent No.: US 8,269,773 B2
(45) Date of Patent: Sep. 18, 2012

(54) SYSTEM AND METHOD FOR DRAG-AND-DROP GRAPH BUILDING WITH LIVE FEEDBACK

(75) Inventor: Boyd Alexander Gregg, III, Chapel Hill, NC (US)

(73) Assignee: SAS Institute Inc., Cary, NC (US)

( * ) Notice: Subject to any disclaimer, the term of this patent is extended or adjusted under 35 U.S.C. 154(b) by 548 days.

(21) Appl. No.: 12/402,685

(22) Filed: Mar. 12, 2009

(65) Prior Publication Data

US 2010/0235771 A1    Sep. 16, 2010

(51) Int. Cl.
G06T 11/20 (2006.01)
(52) U.S. Cl. .......................... 345/440; 715/215; 715/769
(58) Field of Classification Search .................. 715/769; 345/440
See application file for complete search history.

(56) References Cited

U.S. PATENT DOCUMENTS

| | | | |
|---|---|---|---|
| 6,529,217 B1 * | 3/2003 | Maguire et al. | 715/769 |
| 6,906,717 B2 * | 6/2005 | Couckuyt et al. | 345/440 |
| 7,089,266 B2 | 8/2006 | Stolte et al. | |
| 7,650,575 B2 * | 1/2010 | Cummins et al. | 715/769 |
| 7,752,566 B1 * | 7/2010 | Nelson | 715/769 |
| 7,999,809 B2 * | 8/2011 | Beers et al. | 345/440 |
| 2005/0168488 A1 | 8/2005 | Montague | |
| 2005/0232055 A1 | 10/2005 | Couckuyt et al. | |
| 2007/0061611 A1 | 3/2007 | Mackinlay et al. | |
| 2007/0136351 A1 * | 6/2007 | Dames et al. | 707/102 |
| 2007/0234226 A1 | 10/2007 | Szeto | |
| 2008/0204476 A1 | 8/2008 | Montague | |

OTHER PUBLICATIONS

Mackinlay, Jock D. et al., "Show Me: Automatic Presentation for Visual Analysis", IEEE Computer Society, 8 pp. (Oct. 27, 2007).

* cited by examiner

*Primary Examiner* — Alvin Tan
(74) *Attorney, Agent, or Firm* — Jones Day

(57) ABSTRACT

Computer-implemented systems and methods provide near real-time graph data feedback to a user during a drag-and-drop graph display creation process. A graph creation display region is displayed, where a graph display data structure contains associations between graph display components and variables, the associations in the graph display data structure defining what graph components are to be displayed on the graph creation display region. The display device contains a plurality of graph hotspot regions that are associated with a graph display component, where using the user manipulation device to drag a variable from the variable selection region to the graph hotspot results in an association between the graph display component and the dragged variable. While the variable is being dragged over a hotspot, the graph creation display region is modified to provide near real-time feedback to the user of a temporary association between the graph display component and the dragged variable.

17 Claims, 42 Drawing Sheets

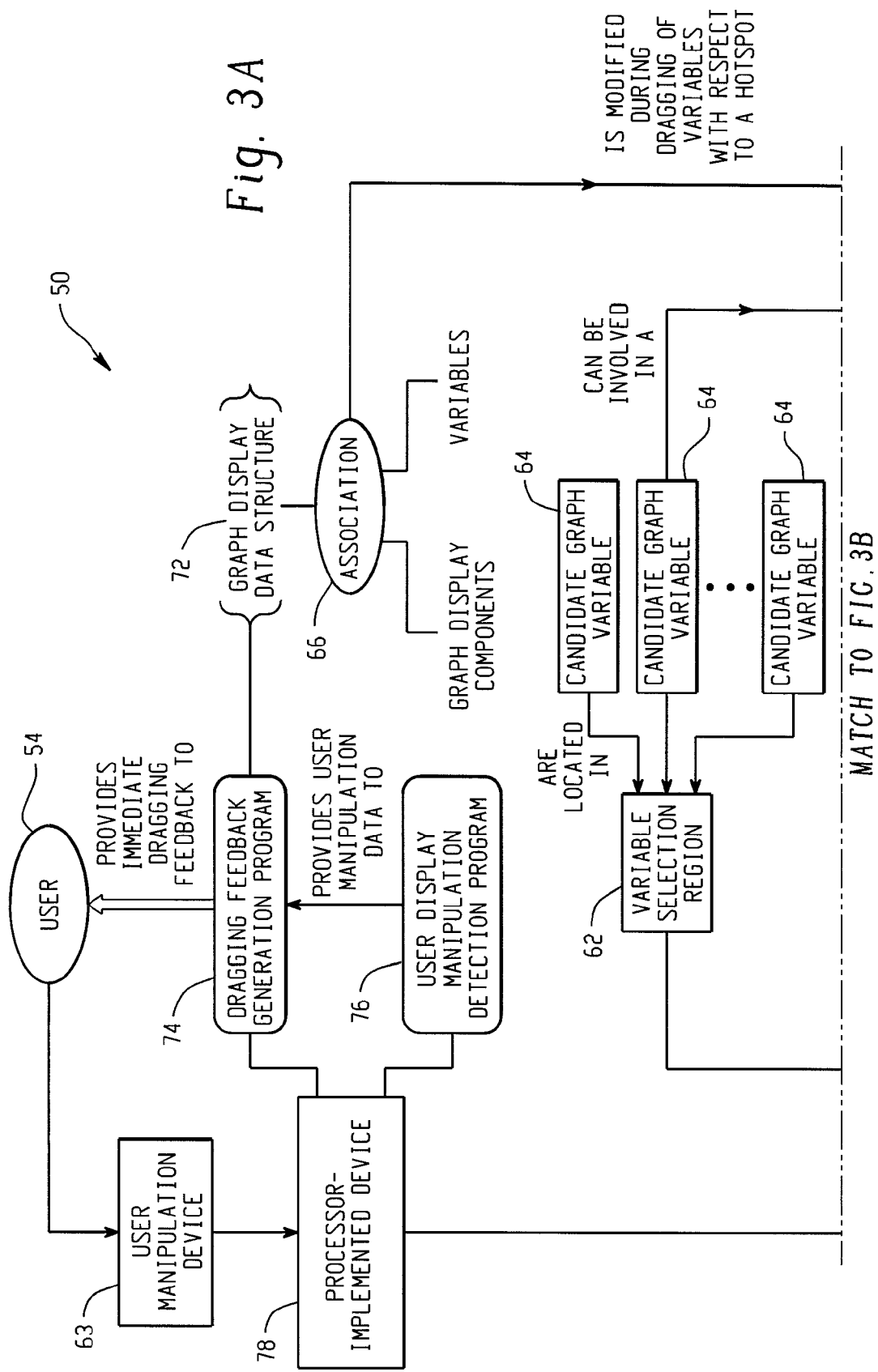

| FACTOR | RESPONSE | ELEMENT DESCRIPTORS |
|---|---|---|
| CONTINUOUS | CONTINUOUS | POINTS, LINE, SMOOTHER, BAR |
| CONTINUOUS | CATEGORICAL | POINTS, LINE, SMOOTHER, BAR, HISTOGRAM |
| CATEGORICAL | CONTINUOUS | POINTS, BOX PLOT, LINE, SMOOTHER, BAR, HISTOGRAM |
| CATEGORICAL | CATEGORICAL | POINTS, MOSAIC, LINE, SMOOTHER, BAR, HISTOGRAM |
| NONE | CONTINUOUS | POINTS, BOX PLOT, BAR, HISTOGRAM |
| NONE | CATEGORICAL | POINTS, MOSAIC, BAR, HISTOGRAM |
| NONE | NONE | POINTS, MOSAIC |

Fig. 6

| GRAPH ROLE | VARIABLE PRESENT | DROP ZONES |
|---|---|---|
| X | NO | ADD |
| X | YES | INSERT BEFORE, REPLACE, INSERT AFTER, MERGE |
| Y | NO | ADD |
| Y | YES | INSERT BEFORE, REPLACE, INSERT AFTER, MERGE |
| GROUP X | NO | ADD |
| GROUP X | YES | INSERT BEFORE, REPLACE, INSERT AFTER, ORDER |
| GROUP Y | NO | ADD |
| GROUP Y | YES | INSERT BEFORE, REPLACE, INSERT AFTER, ORDER |
| GROUP WRAP | NO | ADD |
| GROUP WRAP | YES | INSERT BEFORE, REPLACE, INSERT AFTER, ORDER |
| OVERLAY | NO | ADD |
| OVERLAY | YES | REPLACE |

*Fig. 9*

VARIABLES AND DRAG ZONES　　　　　　　　　　　337

| NAME | GRAPH ROLE | POSITION | TENTATIVE |
|---|---|---|---|
| HEIGHT | X | 0 | NO |

DROP ZONES　　　　　　　　　　　339

| NAME | GRAPH ROLE | POSITION | ACTION |
|---|---|---|---|
| HEIGHT | X | 0 | INSERT BEFORE |
| HEIGHT | X | 0 | REPLACE |
| HEIGHT | X | 0 | INSERT AFTER |
| HEIGHT | X | 0 | MERGE |
| (NONE) | Y | 0 | ADD |
| (NONE) | GROUP X | 0 | ADD |
| (NONE) | GROUP Y | 0 | ADD |
| (NONE) | GROUP WRAP | 0 | ADD |
| (NONE) | OVERLAY | 0 | ADD |

ELEMENT DESCRIPTORS　　　　　　　　　　　331

| KIND | VARIABLES | XY POSITION | ACTIVE |
|---|---|---|---|
| POINTS | HEIGHT | 0,0 | YES |
| BOX PLOT | HEIGHT | 0,0 | NO |
| BAR CHART | HEIGHT | 0,0 | NO |
| HISTOGRAM | HEIGHT | 0,0 | NO |

*Fig. 19B*

VARIABLES AND DRAG ZONES 356

| NAME | GRAPH ROLE | POSITION | TENTATIVE |
|---|---|---|---|
| HEIGHT | X | 0 | NO |
| WEIGHT | Y | 0 | YES |

358

DROP ZONES 360

| NAME | GRAPH ROLE | POSITION | ACTION |
|---|---|---|---|
| HEIGHT | X | 0 | INSERT BEFORE |
| HEIGHT | X | 0 | REPLACE |
| HEIGHT | X | 0 | INSERT AFTER |
| HEIGHT | X | 0 | MERGE |
| (NONE) | Y | 0 | ADD |
| (NONE) | GROUP X | 0 | ADD |
| (NONE) | GROUP Y | 0 | ADD |
| (NONE) | GROUP WRAP | 0 | ADD |
| (NONE) | OVERLAY | 0 | ADD |

362

ELEMENT DESCRIPTORS 364

| KIND | VARIABLES | XY POSITION | ACTIVE |
|---|---|---|---|
| POINTS | HEIGHT, WEIGHT | 0,0 | YES |
| LINE | HEIGHT, WEIGHT | 0,0 | NO |
| SMOOTHER | HEIGHT, WEIGHT | 0,0 | YES |
| BAR CHART | HEIGHT, WEIGHT | 0,0 | NO |

*Fig. 21B*

VARIABLES AND DRAG ZONES ⟵ 439

| NAME | GRAPH ROLE | POSITION | TENTATIVE |
|---|---|---|---|
| HEIGHT | X | 0 | NO |
| WEIGHT | Y | 0 | NO |
| SEX | GROUP X | 0 | NO |
| AGE | Y | 1 | YES |

DROP ZONES ⟵ 440

| NAME | GRAPH ROLE | POSITION | ACTION |
|---|---|---|---|
| HEIGHT | X | 0 | INSERT BEFORE |
| HEIGHT | X | 0 | REPLACE |
| HEIGHT | X | 0 | INSERT AFTER |
| HEIGHT | X | 0 | MERGE |
| WEIGHT | Y | 0 | INSERT BEFORE |
| WEIGHT | Y | 0 | REPLACE |
| WEIGHT | Y | 0 | INSERT AFTER |
| WEIGHT | Y | 0 | MERGE |
| SEX | GROUP X | 0 | INSERT BEFORE |
| SEX | GROUP X | 0 | REPLACE |
| SEX | GROUP X | 0 | INSERT AFTER |
| SEX | GROUP X | 0 | ORDER |
| (NONE) | GROUP Y | 0 | ADD |
| (NONE) | GROUP WRAP | 0 | ADD |
| (NONE) | OVERLAY | 0 | ADD |

ELEMENT DESCRIPTORS ⟵ 442

| KIND | VARIABLES | XY POSITION | ACTIVE |
|---|---|---|---|
| POINTS | HEIGHT, WEIGHT | 0,0 | YES |
| LINE | HEIGHT, WEIGHT | 0,0 | NO |
| SMOOTHER | HEIGHT, WEIGHT | 0,0 | YES |
| BAR CHART | HEIGHT, WEIGHT | 0,0 | NO |
| POINTS | HEIGHT, AGE | 0,1 | YES |
| LINE | HEIGHT, AGE | 0,1 | NO |
| SMOOTHER | HEIGHT, AGE | 0,1 | NO |
| BAR CHART | HEIGHT, AGE | 0,1 | NO |
| HISTOGRAM | HEIGHT, AGE | 0,1 | NO |

*Fig. 28B*

SYSTEM AND METHOD FOR DRAG-AND-DROP GRAPH BUILDING WITH LIVE FEEDBACK

TECHNICAL FIELD

This document relates generally to graph data visualization, and more particularly to graph construction using real-time feedback.

BACKGROUND

Interactive graph construction typically involves assigning variables to roles and clicking a "Go" button to create the graph. Some interfaces may be more interactive and update the graph after each variable is associated with a role. However, there is still some measure of indirection for which the user must account. This inability to foresee the resulting graph structure prior to assigning a variable to a role introduces indecisiveness and inefficiency into the graph creation process, which may become significant when extrapolated over the creation of large numbers of complicated graphs.

SUMMARY

In accordance with the teachings provided herein, computer-implemented systems and methods are disclosed for providing immediate or near real-time graph data feedback to a user during a drag-and-drop graph display creation process. The systems and methods may include displaying on a computer-human interface display device a graph creation display region that includes at least one axis, where a graph display data structure is configured to be stored in a computer-readable storage medium and to contain associations between graph display components and variables, and the associations contained in the graph display data structure define what graph components are to be displayed on the graph creation display region. A variable selection region may be displayed on the computer-human interface display device for selection via a user manipulation device of a variable to be graphically displayed on the computer-human interface device, where the computer-human interface display device contains a plurality of graph hotspots, a graph hotspot being a region on the computer-human interface display that is associated with a graph display component. Using the user manipulation device to drag a variable from the variable selection region to the graph hotspot may result in a temporary association between the associated graph display component and the dragged variable being created in the graph display data structure. The display of the graph creation display region may be modified while the variable is being dragged over a hotspot on the computer-human interface display device in order to provide immediate or near real-time feedback to the user of a temporary association between the associated graph display component and the dragged variable.

As another example, a system and method are configured to provide immediate or near real-time graph data feedback to a user during a drag-and-drop graph display creation process. The system may include computer-readable instructions for displaying on a computer-human interface display device a graph creation display region that includes at least one axis, where a graph display data structure is configured to be stored in a computer-readable storage medium and to contain associations between graph display components and variables, and where the associations contained in the graph display data structure define what graph components are to be displayed on the graph creation display region. The system may further include computer-readable instructions for displaying on the computer-human interface display device a variable selection region for selection via a user manipulation device of a variable to be graphically displayed on the computer-human interface device, where the computer-human interface display device contains a plurality of graph hotspots, a graph hotspot being a region on the computer-human interface display that is associated with a graph display component. Using the user manipulation device to drag a variable from the variable selection region to the graph hotspot may result in a temporary association between the associated graph display component and the dragged variable being created in the graph display data structure. The system may also include computer-readable instructions for modifying display of the graph creation display region while the variable is being dragged over a hotspot on the computer-human interface display device in order to provide immediate or near real-time feedback to the user of a temporary association between the associated graph display component and the dragged variable.

BRIEF DESCRIPTION OF THE DRAWINGS

FIGS. 3A and 3B depict a block diagram depicting interactions between a user and a live feedback drag-and-drop graph builder environment.

FIG. 6 depicts a table identifying appropriate element descriptors for plotting data points based on the modeling types of the X and Y variables.

FIG. 9 is a table depicting available graph hotspots based on existing associations between variables and graph components.

FIGS. 19A and 19B depict a graph creation display region following a subsequent dropping of the height variable on the X-axis hotspot.

FIGS. 21A and 21B depict a graph creation display region following a further dragging of the weight variable to a Y-axis hotspot.

FIGS. 28A and 28B depict a graph creation display region following dragging an age variable onto an insert after hotspot on the Y-axis.

DETAILED DESCRIPTION

Figure 1:
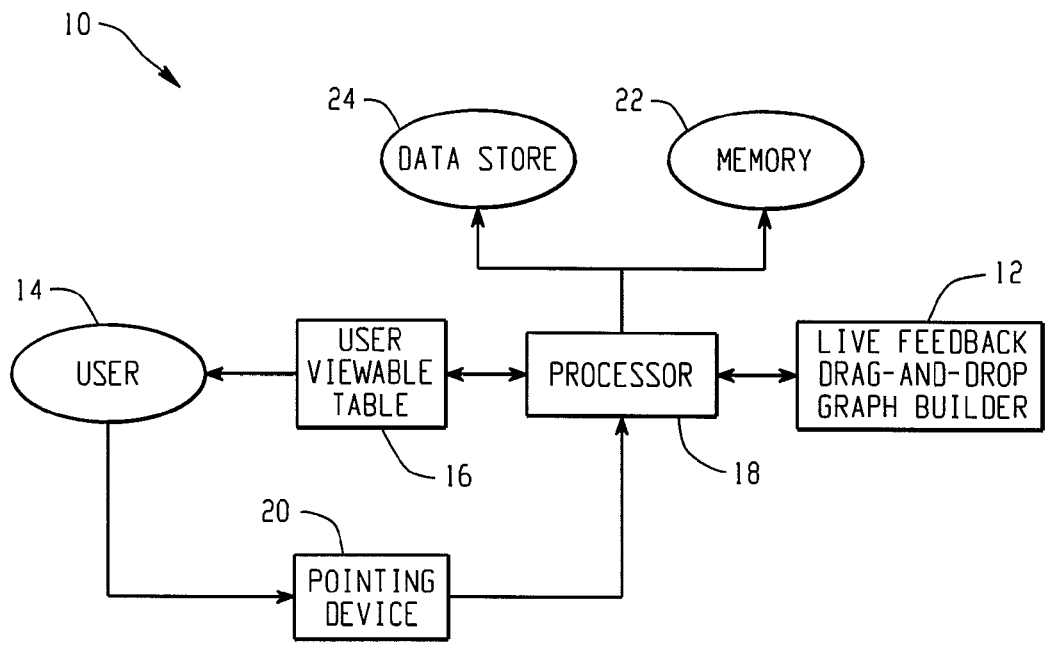
FIG. 1 depicts a computer-implemented environment where users can interact with a live feedback drag-and-drop graph builder.

FIG. 1 depicts a computer-implemented environment where users can interact with a live feedback drag-and-drop graph builder. The live feedback drag-and-drop graph builder 12 mitigates indirection in graph display creation by providing direct and immediate graph manipulation, allowing more efficient data exploration. The live feedback drag-and-drop graph builder 12 increases the level of interactivity by constructing a graph as each variable is being dragged over various hotspots on the graph area, such that immediate or near-real time (i.e., allowing for a limited processing time for graph creation display region preview generation) feedback of the effect of graph manipulations on a graph creation display region. A user 14 is able to immediately see the result of dropping a variable onto a hotspot without actually committing to the action. A user 14 may then continue dragging the variable to another hotspot, and the graph is immediately reconstructed as the variable is moved.

The computer-implemented environment 10 of FIG. 1 provides a user 14 with a user viewable display 16, or computer-human interface display device, for visualizing, among other things, a graph creation display region for constructing a data display graph by associating variables with graph components. The contents of the user viewable display 16 are provided via commands from a processor 18 running instructions that include instructions for the live feedback drag-and-drop graph builder 12. The live feedback drag-and-drop graph builder 12 provides an application for user creation of a graph display via pointer device 20, keyboard, or other input manipulation device.

The live feedback drag-and-drop graph builder 12 is responsive to a data store 24 and/or other volatile or non-volatile memory 22. These memory repositories 24, 22 may contain variable data for plotting or other incorporation into the graph creation display region as well data structures for tracking associations between variables and graph display components. Examples of memory repositories 24, 22 can include flat files, relational database management systems (RDBMS), a multi-dimensional database (MDDB), such as an Online Analytical Processing (OLAP) database, etc.

Figure 2:
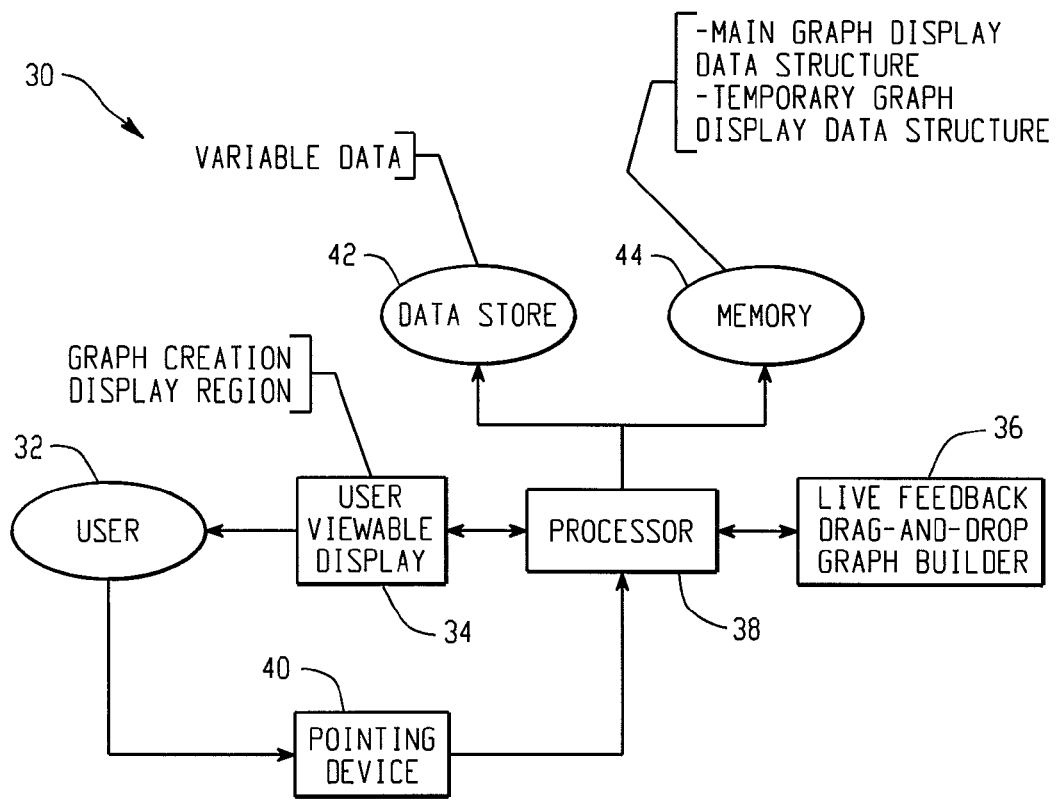
FIG. 2 depicts memory repository contents in a live feedback drag-and-drop graph builder environment.

FIG. 2 depicts memory repository contents in a live feedback drag-and-drop graph builder environment. A user 32 is provided a user viewable display 34 that includes a graph creation display region for specifying the construction of a graph for data display. The graph creation display region is provided via a live feedback drag-and-drop graph builder 36 executed on a processor 38. Using a pointing device 40 or other user input mechanism, a user 32 dictates associations between variables and graph display components that define the graph creation display region. A graph is the entire area being constructed and may included axes, legend, titles, grouping headers, and the graph panels. A graph panel is an area of the graph that contains data representations such as symbols, lines, and bars. For example, in a Cartesian coordinate graph, there may be one panel for each combination of X position, Y position, and grouping levels. While many of the examples described herein depict a Cartesian implementation, the concepts may equally apply to other coordinate systems such as cylindrical, spherical, and others.

The live feedback drag-and-drop graph builder of the computer-implemented environment 30 is responsive to a data store 42 that contains variable data for plotting or other incorporation into the graph creation display region on the user viewable display 34. The live feedback drag-and-drop graph builder 36 may also be responsive to a memory 44, where the live feedback drag-and-drop graph builder 36 maintains a main graph display data structure that defines graph components to be displayed on the graph creation display region. The memory 44 may also contain one or more temporary graph display data structures that could be used to store temporary associations between graph display components and variables during a user manipulation device drag operation. These temporary associations may also be stored in the main graph display data structure along with an indicator of their temporary nature.

Figure 3B:
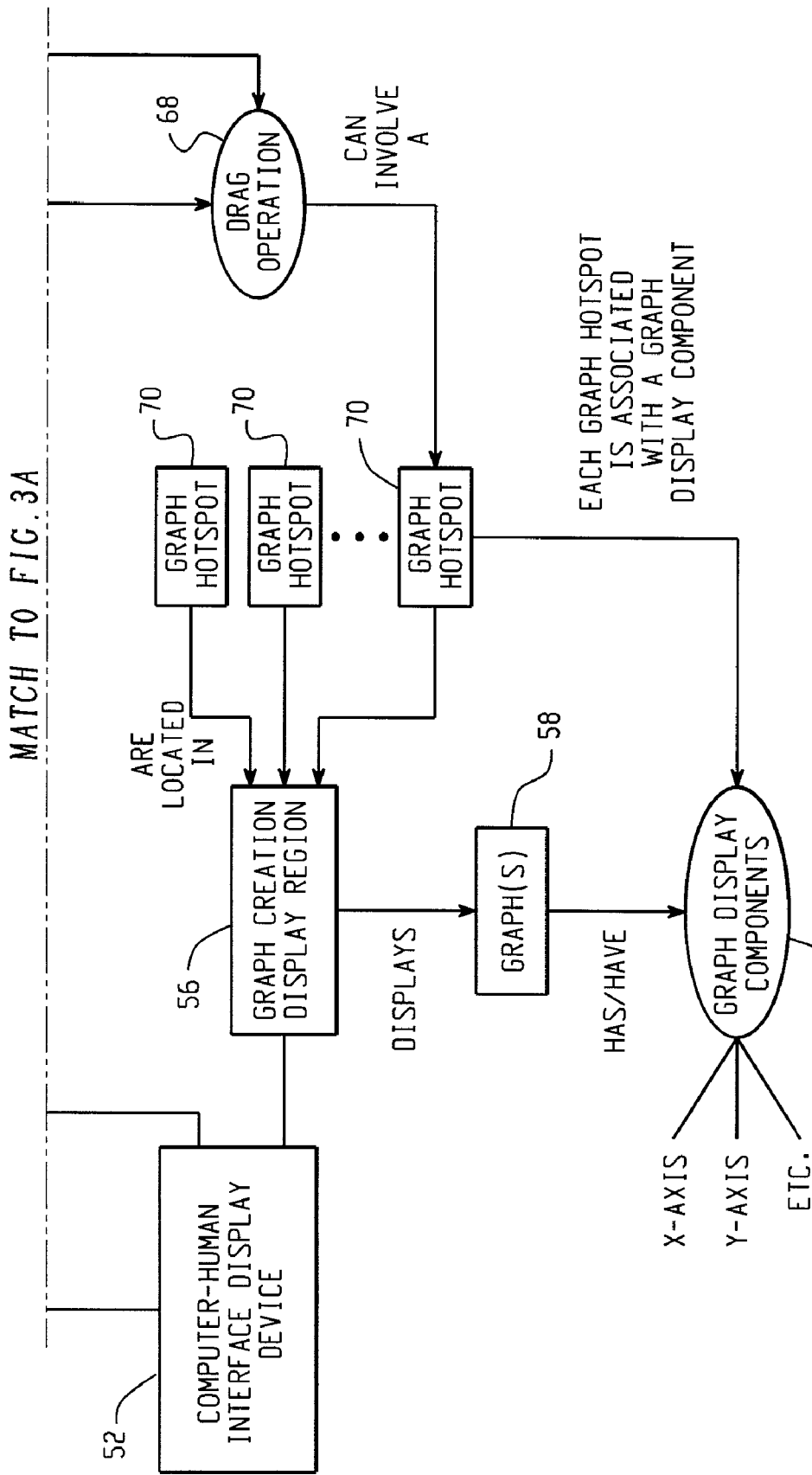

FIGS. 3A and 3B depict a block diagram depicting interactions between a user and a live feedback drag-and-drop graph builder environment. A computer-human interface display device 52, or user viewable display, is provided to a user 54. The computer-human interface display device 52 includes a graph creation display region 56 for display of a graph 58 facilitating user association of variables to graph display components 60, such as X-axis, Y-axis, group X, group Y, overlay, and other components. The live feedback environment 50 may also include a variable selection region 62 for selection via a user manipulation device 63 of a candidate graph variable 64 to be graphically displayed on the graph 58.

An association 66 between a candidate graph variable 64 and a graph display component 60 may be made via a manipulation device drag operation 68 of a candidate graph variable 64 from the variable selection region 62 or a drag hotspot to a graph drop hotspot 70. A graph hotspot is a region on the computer-human interface display 52 that is associated with a graph display component 60. By dragging a candidate graph variable 64 over a graph hotspot 70, a temporary association 66 is made between the associated graph display component 60 and the candidate graph variable 64 in a graph display data structure 72. A candidate graph variable 64 that is already associated with a graph display component 60 may also be dragged from a hotspot associated with that graph display component 60 for association with a different hotspot.

A graph display data structure 72 is stored in a computer-readable storage medium and contains associations between graph display components 66 and candidate graph variables 64. A temporary association 66 may be made in a temporary graph display data structure, or in a main graph display data structure with an indicator of the temporary nature of the association, or via other mechanism. A temporary association may be made persistent via dropping the candidate variable 64 on the current graph hotspot 70 over which the candidate graph variable 64 has been dragged. A dragging feedback generation program 74 provides immediate or near real-time dragging feedback of the temporary associations created via a user display manipulation detection program 76 that senses user commands of a user manipulation device 63 via a data processor 78.

Figure 4:
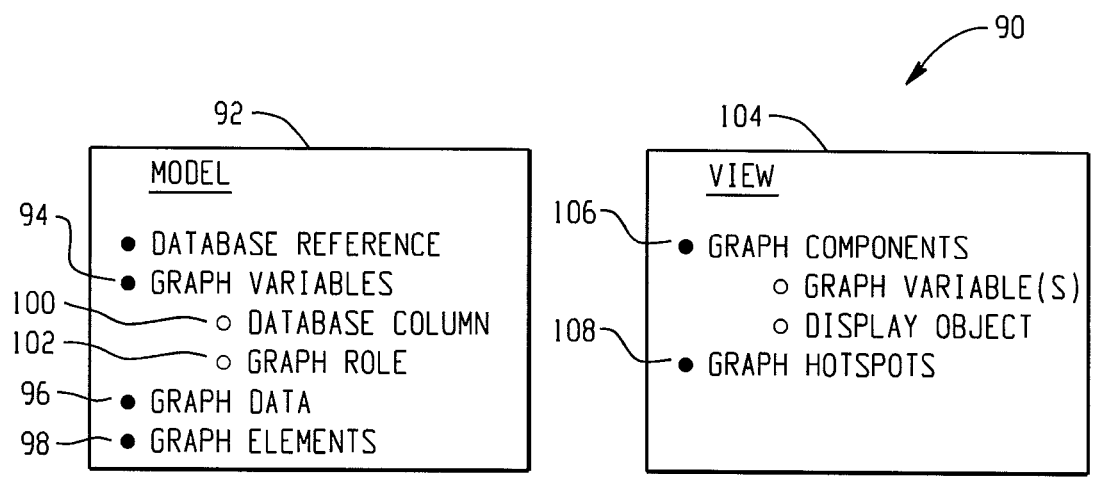
FIG. 4 depicts a model system and a view system for use in a live feedback drag-and-drop graph builder environment.

FIG. 4 depicts a model system and a view system for use in a live feedback drag-and-drop graph builder environment. To accommodate rapid changes corresponding to dragging and dropping operations and associated graph updates and manipulations, the model system 92 of the collection of systems 90 may be implemented using a relatively flat structure. A drag-and-drop controller makes changes to the graph variables list 94, while the graph data 96 and graph elements 98 are updated as needed for the view. Each graph variable 94 contains a data capture from a database column 100 and associates the database column 100 with a graph role and position 102. The graph roles identify the role a variable plays in a graph, and may include X-axis, Y-axis, group X, group Y, group wrap, and overlay. The graph data 96 may contain sorted X and Y data values partitioned by any grouping and overlay variables that are present in the model. A graph element is a data representation within a graph panel that may consist of one or more symbols, lines, or filled areas, and the graph elements list is a list of potential representations for the data in each graph pane, which may be realized by the view when needed.

The view system 104 contains logic for creation and positioning of graph components 106 and graph hotspots 108 for use by a drag-and-drop controller. Each graph component 106 serves as a view for one or more graph variables 94. Each graph hotspot defines an area on the display and associates a role and an action with it.

The drag-and-drop controller may hold a variable from the database. Whenever a variable is dragged by a mouse or other user manipulation device over a graph hotspot 108 the controller adds the corresponding graph variable 94 to the model and marks the graph variable 94 as tentative until the mouse is released. Graph components 106 that correspond to the tentative graph variables are drawn on the graph. These graph components 106 may be drawn with a translucent mask or other highlight to identify the pending change to the graph. A system may dictate that a pending change not alter existing graph hotspots 108, as graph hotspots 108 may be dependent on current associations between graph variables 94 and graph components 106. This avoids a graph hotspot 108 being moved from under the drag-and-drop controller. The graph variable 94 being added to the model is constructed by combining the database column from the drag source and the role and action information from the graph hotspot 108. If the user manipulation device leaves the graph hotspot 108, then the controller may remove the graph variable 94 from the model and update the view accordingly.

Figure 5:
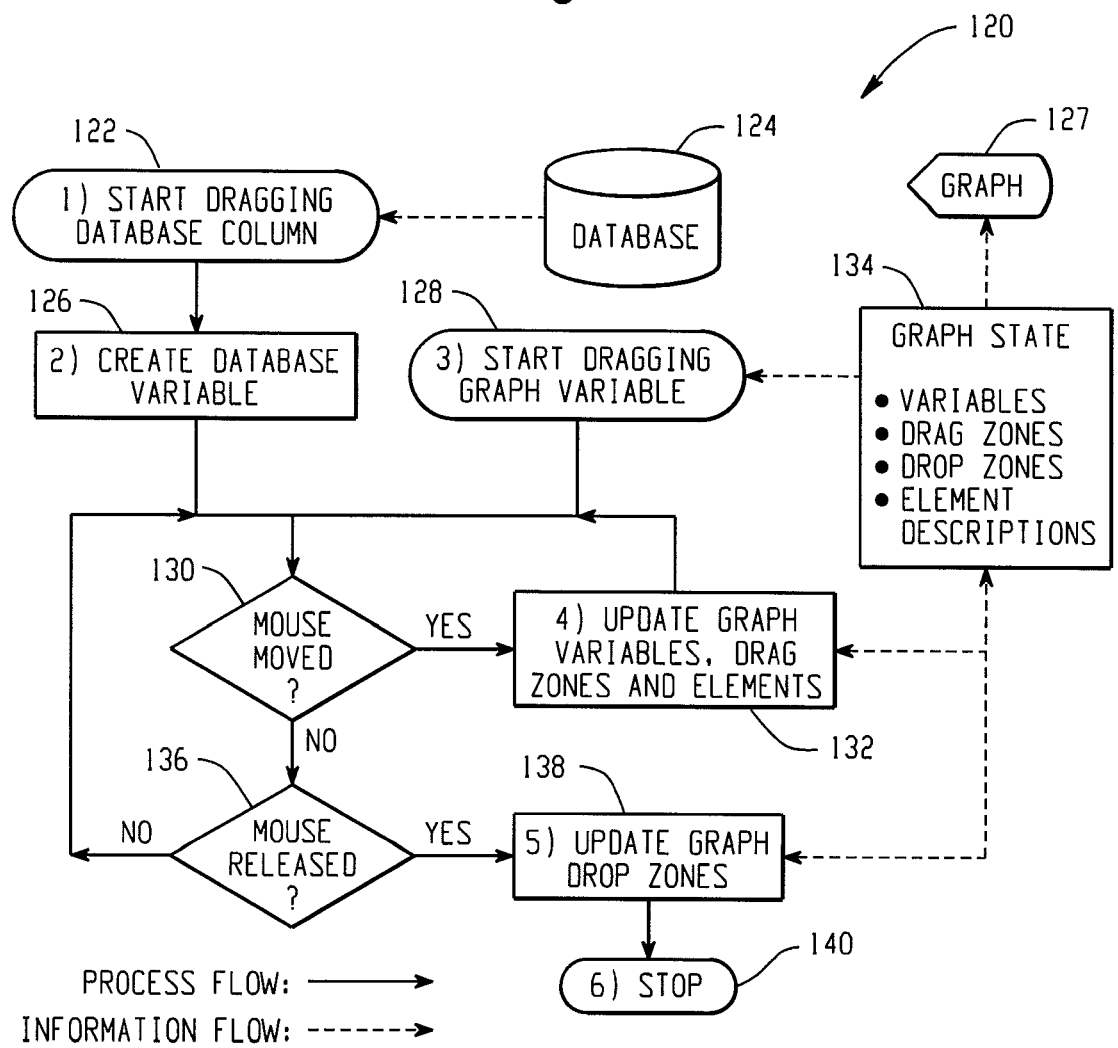
FIG. 5 depicts a flow diagram for placing a variable in a graph via a drag-and-drop user interface.

FIG. 5 depicts a flow diagram for placing a variable in a graph via a drag-and-drop user interface. The process 120 may begin at 122 where a database column associated with a database 124 is clicked upon and dragged from a variable selection region on a computer-human interface display device. A database variable is created at 126 to capture the aspects of the database column needed for the graph 127, which may include the modeling type (e.g., categorical or continuous) and the data itself and a sort index. The process may alternately begin at 128 where a user clicks on a drag zone hotspot in the graph to start moving an existing graph variable to a different place. The existing database variable component of the dragged graph variable will be preserved though other parts of the graph variable may be discarded.

A determination is made at 130 as to whether the mouse or other user manipulation device has moved during a drag operation. As the mouse is moved with the selection mechanism activated (e.g., with the button held down on a mouse), the graph state 134 is updated at 132 based on which graph hotspot the mouse is currently over, and the graph is redrawn. The graph state 134 may include variables to be displayed, drag zones consisting of hotspots already having an associated graph variable, drop zones consisting of hotspots where the dragged variable may be dropped, and element descriptors. If the mouse is not over a drop zone hotspot at 132, then the variable is removed from the graph state. As noted above, drop zones may not be updated at 132 to avoid the removal of a drop zone from under the mouse.

Upon release of the mouse at 136, previous temporary updates to the model are preserved, as indicated at 138, and drop zone hotspots may be updated based on the rest of the graph state 134. A single drag and drop operation has, thus, been completed, as indicated at 140, and the process may then be repeated with other dragging and dropping operations.

As noted above, a graph state may be defined in part by element descriptors. An element descriptor is a part of the graph state that is able to create a particular graph element. Element descriptors may contain references to graph variables and collect data from the graph variables and provide the data to the graph element being constructed. An X/Y variable combination may correspond to a set of element descriptors that are appropriate for those graph variables. Element descriptors may be active or inactive. Active element descriptors create corresponding graph elements that appear in the graph panels, while inactive element descriptors may be made available for activation by the user, for example, via a contextual popup menu.

The modeling types (e.g., categorical or continuous) of the variables may be used to determine the set of element descriptors that are appropriate. In a determination of the appropriate element descriptors for a given X/Y variable combination, the variables may be cast as responses and factors. The Y variable may be denoted as the response, with the X variable being labeled the factor. In some cases, where no Y variable is specified or if there is a single categorical Y variable and continuous X variables, the response/factor casting may be reversed. If either the X or Y role contains more than one variable, then the first variable's modeling type may be used for all of the variables.

FIG. 6 depicts a table identifying appropriate element descriptors for plotting data points based on the modeling types of the X and Y variables. For example, if both the factor and the response are continuous variables, then the points, line, smoother, and bar element descriptors are deemed appropriate. In contrast, where the factor is categorical and the response is continuous, the points, box plot, line, smoother, bar, and histogram element descriptors are identified as appropriate.

The points element descriptor may be set as a default, as it is appropriate for all X/Y variable combinations. This may be varied by preference or in special cases, such as where a large amount of data (e.g., over 500 points) are to be plotted. In high data scenarios, if both the factor and response are continuous, then the smoother element descriptor may be initially set as active, with the second listed appropriate element descriptor initialized otherwise. A system may be configured to allow a user to select from among appropriate element descriptors, such as via a context menu.

Data structures, such as those described above with reference to FIG. 4, are used in creating and updating the graph displayed to a user. When a graph variable is added to the model, the data for the graph variable may be immediately scored. Scoring consists of sorting the data into unique values and determining the data's range and modeling type. Data for all variables (e.g., X and Y variables) may be sorted and partitioned by the levels of each grouping variable (e.g., group X, group Y, group Wrap, and overlay). These sorting results may be shared by element descriptors for efficiency.

Each time the graph state changes, such as through the addition of a graph variable, the graph may be updated. The data may be sorted and partitioned according to the grouping variables. Element descriptors may be made, and active element descriptors may be identified based on defaults or previous user choices. Graph display objects that correspond to graph variables may be made along with placeholder graph display objects for graph roles that have no graph variables. Graph elements may then be made from active element descriptors, with graph axis scales being set to match the graph elements. User customizations, such as size and color changes may be made, and graph hotspots corresponding to drag and drop zones may be defined. Certain changes to the graph state may require that only some of these steps be taken or that steps be executed in different orders. For example, if a user changes an active element descriptor without changing the graph variables, then only the later steps need be performed. Similarly, a user making a cosmetic change may only require refreshing of those graph components affected by the cosmetic change.

Figure 7:
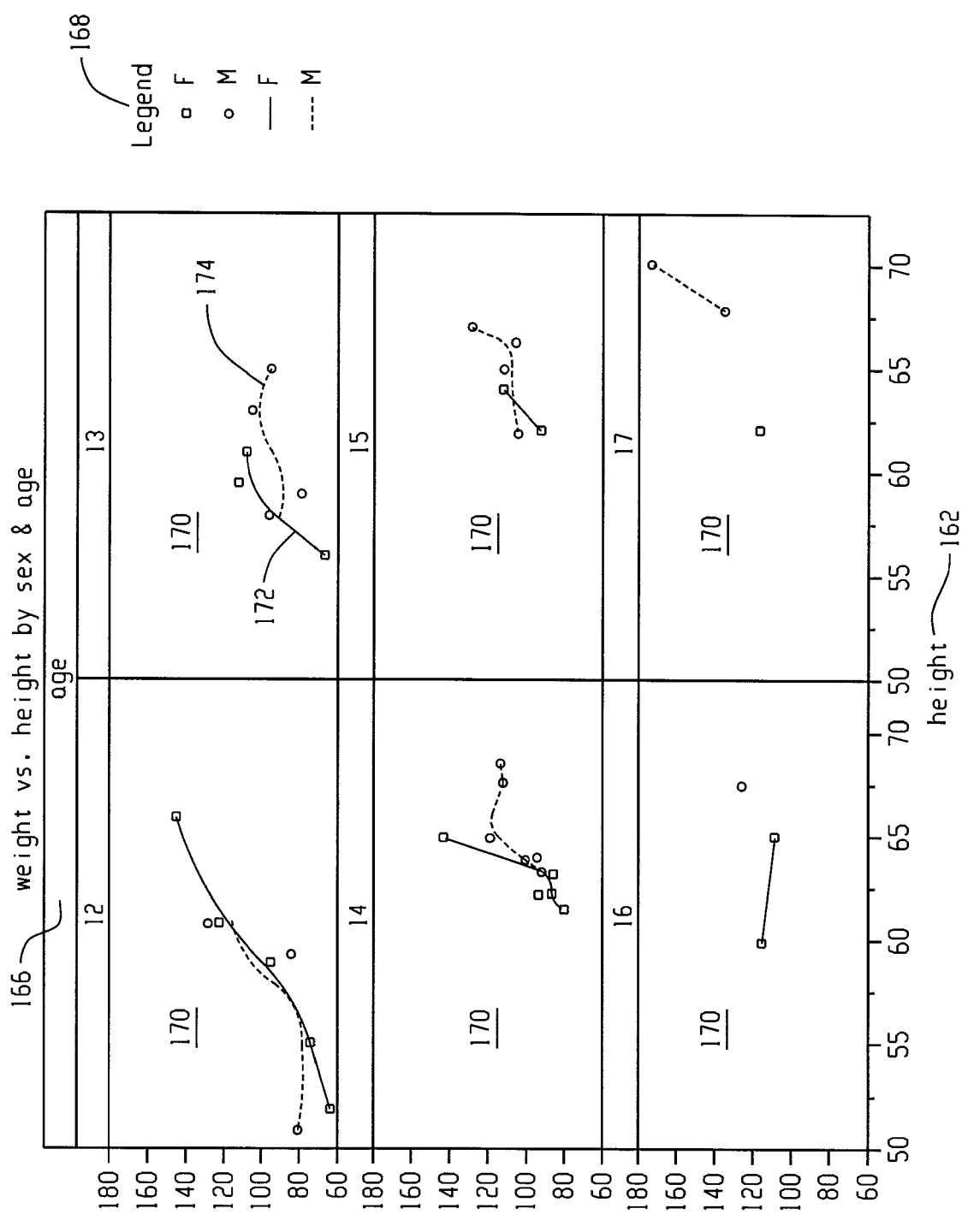
FIG. 7 depicts an example graph generated using a live feedback drag-and-drop graph builder.

FIG. 7 depicts an example graph generated using a live feedback drag-and-drop graph builder. On the example graph 160, a height variable has been assigned to the X-axis 162, a weight variable has been assigned to the Y-axis 164, an age variable has been assigned to the group wrap role 166, and a sex variable has been assigned to the overlay role 168. The association of the height variable with the X-axis 162 causes data to be plotted according to the height variable on the X-axis 162 with the X-axis 162 being scaled accordingly. Similarly, the association of the weight variable with the Y-axis 164 causes data to be plotted according to the weight variable on the Y-axis 164 with the Y-axis 164 being scaled accordingly. Associating the age variable with the group wrap role 166 generates a single graph panel 170 for each age value, and associating the sex variable with the overlay role 168 instructs the system to plot a best fit representation of the data for the male sex 172 and the female sex 174 on each graph panel.

Figure 8:
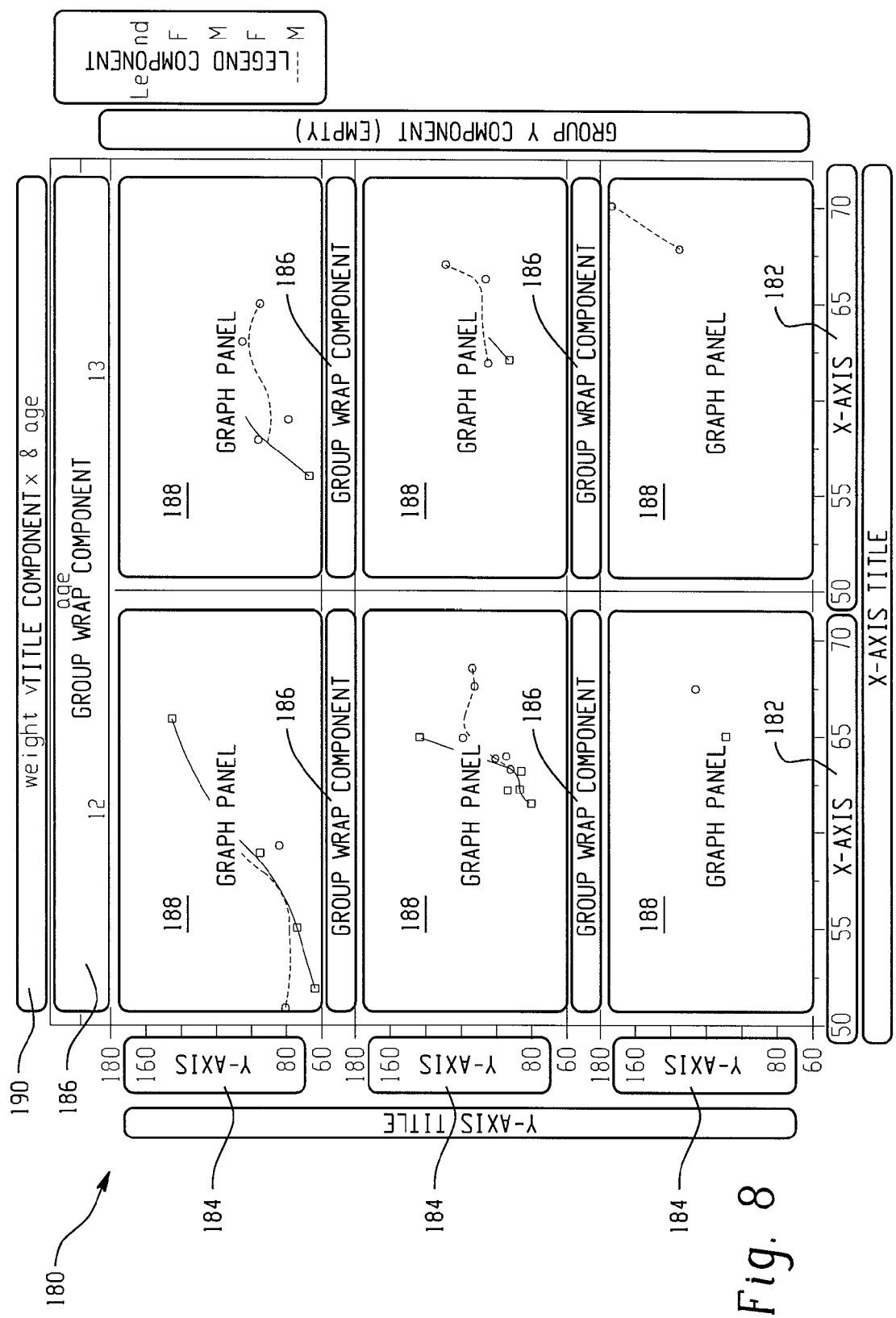
FIG. 8 depicts an example graph generated using a live feedback drag-and-drop graph builder having highlighted graph components.

FIG. 8 depicts an example graph generated using a live feedback drag-and-drop graph builder having highlighted graph components. On the example graph 180, the single X variable, height, is represented by two X axis components 182. The single Y variable, weight, is represented by three Y axis components 184. The single group wrap variable, age, is represented by several components 186. A separate graph panel component 188 is depicted for each combination of X, Y, and levels of the group wrap variable. With single combinations for both the height and weight variables and six levels of the age variable, six graph panels 188 are displayed. The default title component 190 may not correspond to any one graph variable but is instead determined from the names of all graph variables utilized.

FIG. 9 is a table depicting available graph hotspots based on existing associations between variables and graph components. As noted above, a determination as to which hotspot regions are to be incorporated on the graph creation display region may be made in part based on existing associations. For example, it may not make sense to have a replace hotspot or an insert before hotspot on the X-axis if a variable is not currently associated with the X-axis. FIG. 9 lists a series of graph roles, and appropriate graph hotspots that may be incorporated by the live feedback drag-and-drop graph builder according to existing variable associations with those graph components.

Figure 10:
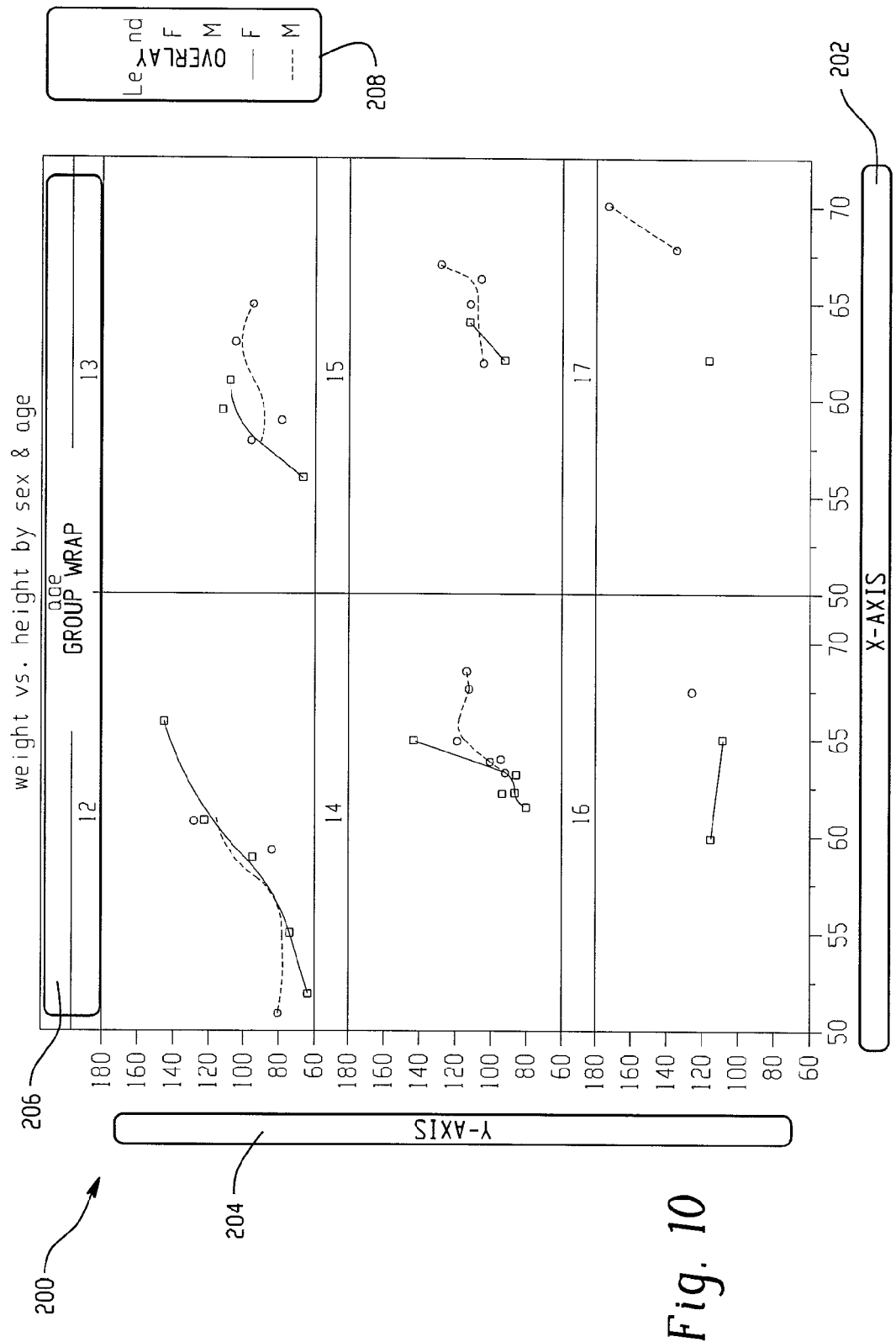
FIG. 10 depicts sample drag zone hotspots in a graph creation display region.

FIG. 10 depicts sample drag zone hotspots in a graph creation display region. The graph creation display region 200 depicts a series of graph panels generated in response to associating a height variable with the X-axis 202, a weight variable with the Y-axis 204, an age variable with the group wrap role 206, and a sex variable with the overlay role 208. Having made these associations, the hotspots associated with these roles may be made drag zones, where a user may select the drag zone and drag the associated variable off of the hotspot. The dragged variable may be dragged to another hotspot to create a new association, or the dragged variable may be removed such that the dragged variable's prior association is removed from the graph display data structures.

Figure 11:
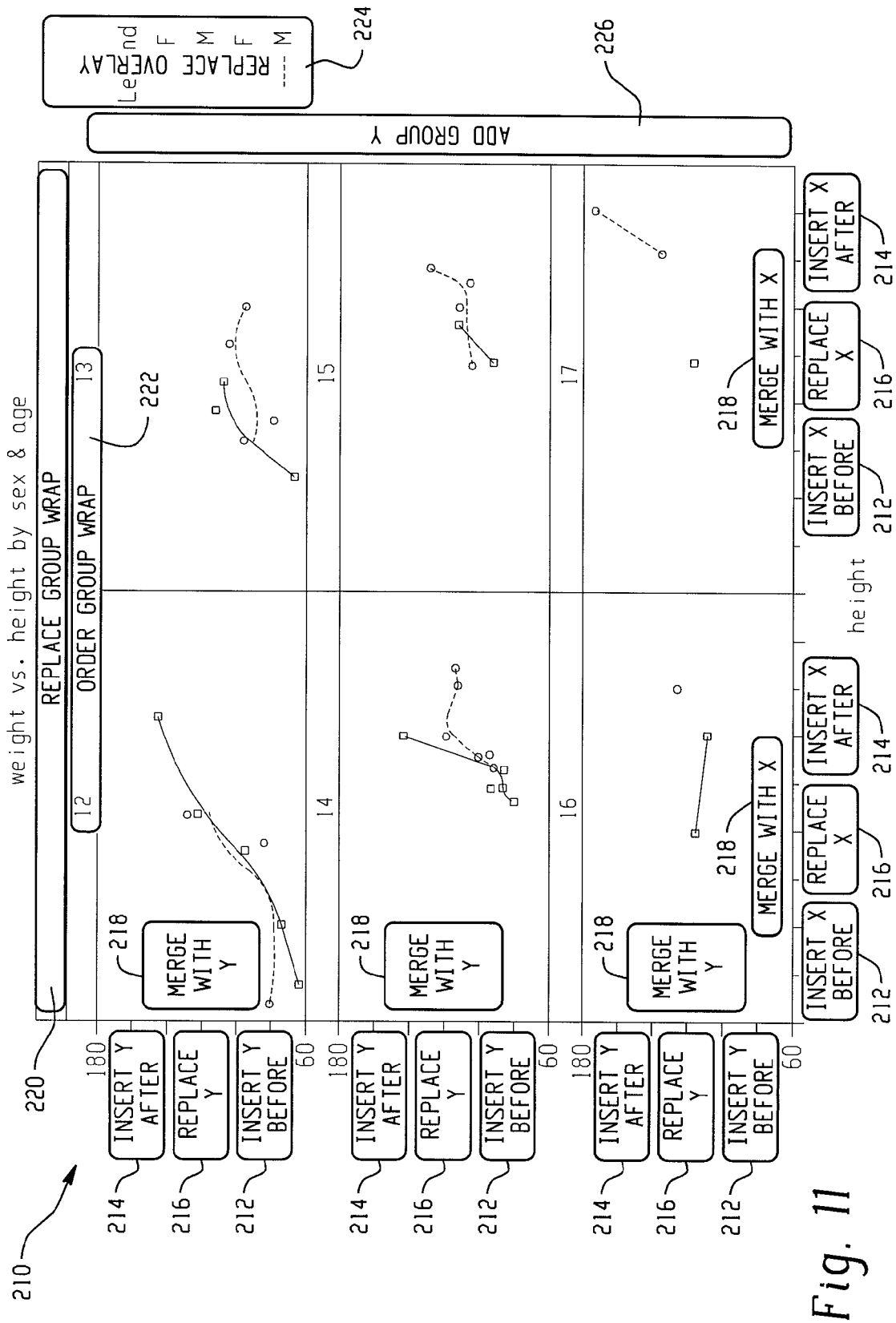
FIG. 11 depicts sample drop zone hotspots in a graph creation display region.

FIG. 11 depicts sample drop zone hotspots in a graph creation display region. As noted above, which drop zone hotspots are made available may be determined in part based upon existing associations between variables and graph components. This is illustrated in the graph creation display region 210 of FIG. 11, where both the X-axis and Y-axis have insert before 212, insert after 214, replace 216, and merge 218 hotspots because of prior associations between the height and weight variables and the X and Y axes, respectively. The group wrap role includes a replace group wrap 220 and an order group wrap 222 hotspot. An order variable allows specification of the ordering of graph panels associated with the group wrap variable. For example, if the group X component was associated with the U.S. States variable, the order role could be associated with the population variable, which would display the individual state graph panels sorted by state population. The overlay role includes a replace overlay hotspot 224, and the group Y role shows an add group Y hotspot 226 based on the non-existence of a variable association.

Figure 12:
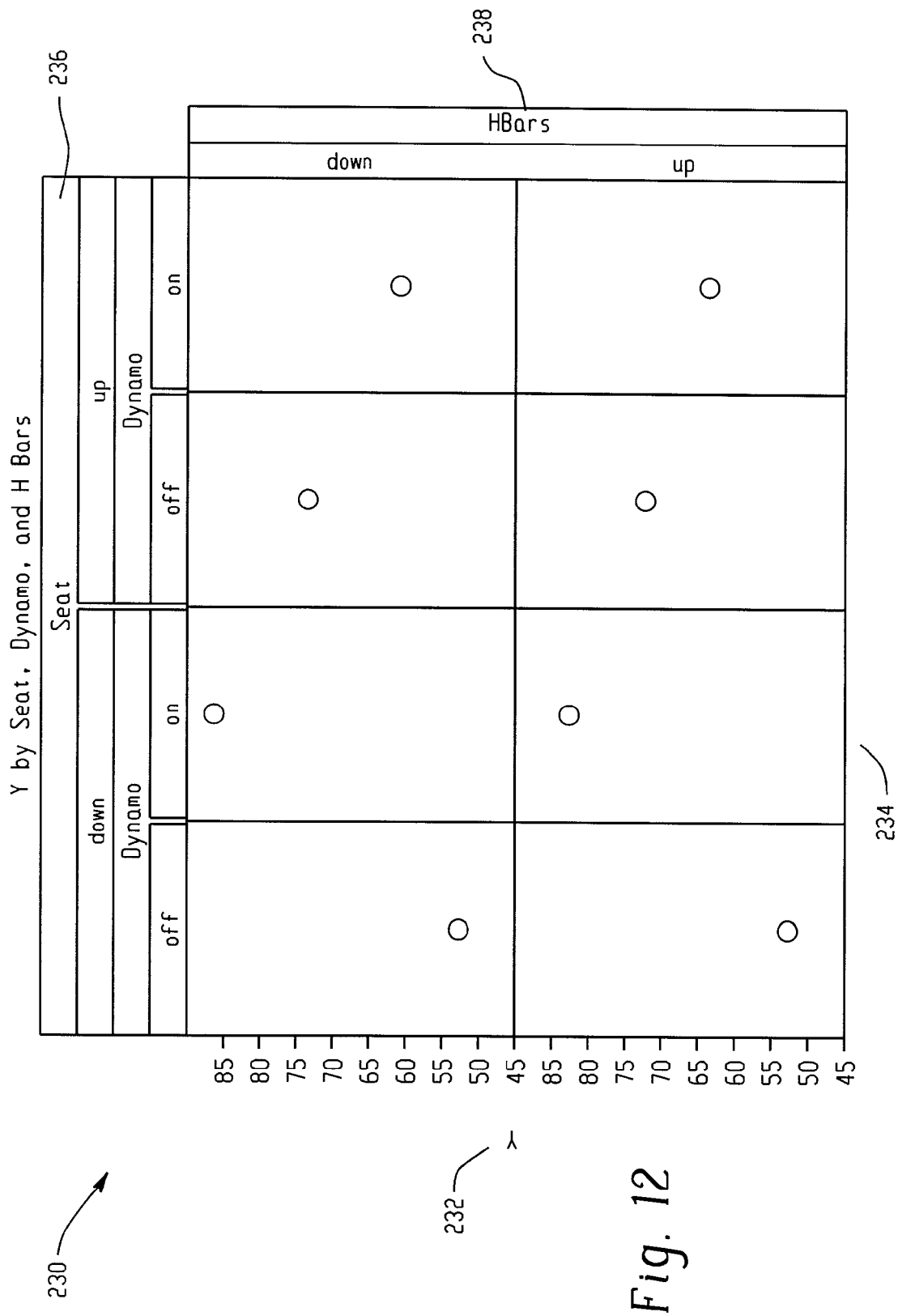
FIG. 12 depicts a graph having one Y variable, two group X variables, and one group Y variable.

FIG. 12 depicts a graph having one Y variable, two group X variables, and one group Y variable. On the graph 230, a Y position variable has been associated with the Y-axis 232, while no variables have been associated with the X-axis 234. Two categorical variables, seat and dynamo, have been associated with the group X role, with the dynamo variable, having on and off states, being nested beneath the seat variable, having up and down states. The group X role 236 functions in contrast to the group wrap role by dividing graph panels only along the X-axis 234, where the group wrap role may divide graph panels along both the X-axis 234 and the Y-axis 232 in a wrapping manner, as shown in FIG. 7. The hbars categorical variable, having up and down states, is associated with the group Y role 238.

Figure 13:
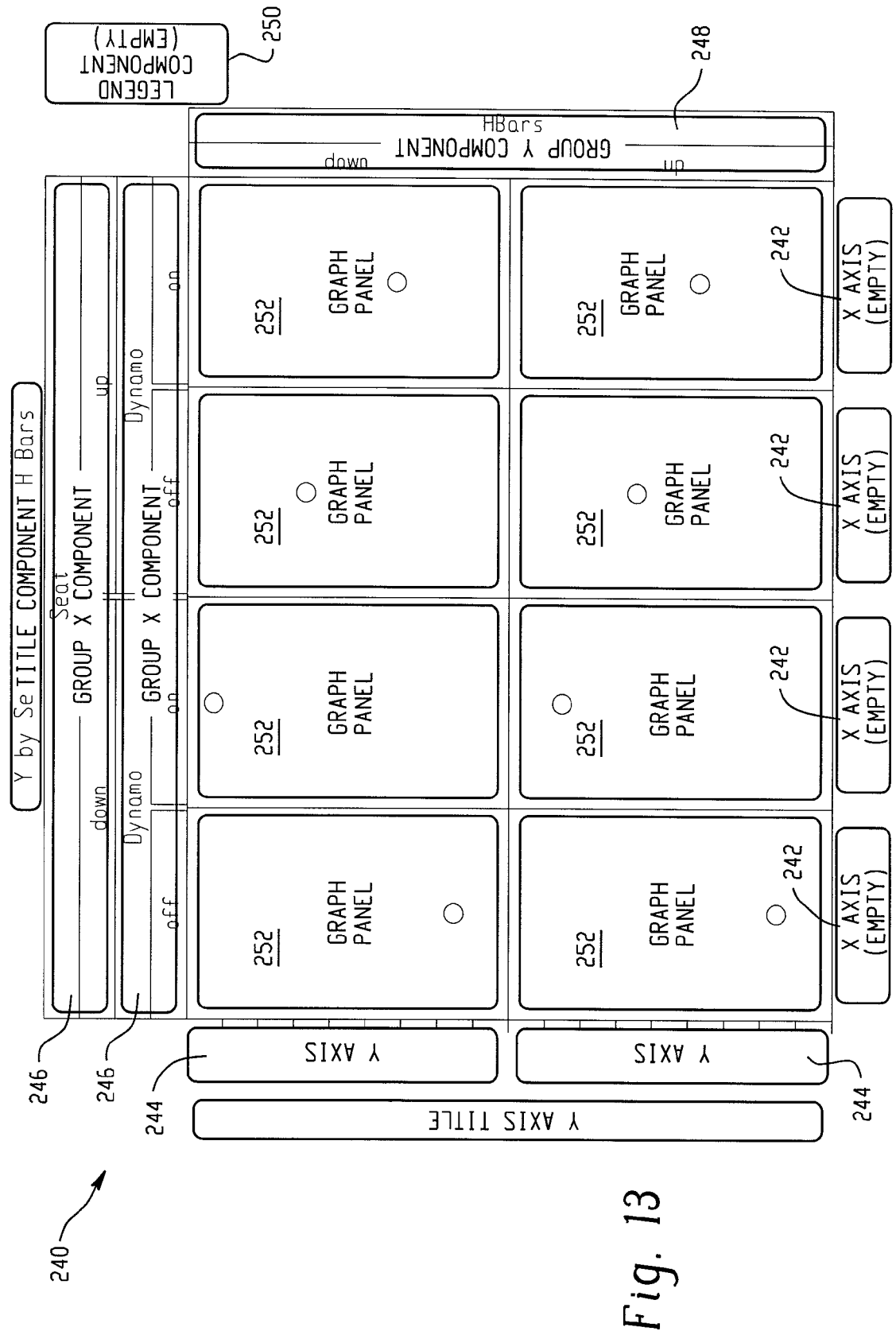
FIG. 13 depicts graph components of a graph having one Y variable, two group X variables, and one group Y variable.

FIG. 13 depicts graph components of a graph having one Y variable, two group X variables, and one group Y variable. The graph creation display region includes empty X-axis components 242 and a Y-axis 244 component associated with the Y position variable. The group X role has two components 246 corresponding to the seat variable and the dynamo variable nested within the seat variable. The group Y component 248 contains an association with the hbars variable, and the legend component 250 has no variable association. The graph creation display region 240 includes separate graph panels for each combination of X, Y, and levels of the group X, and group Y variables resulting in 8 (1×1×2×2×2=8) graph panels 252.

Figure 14:
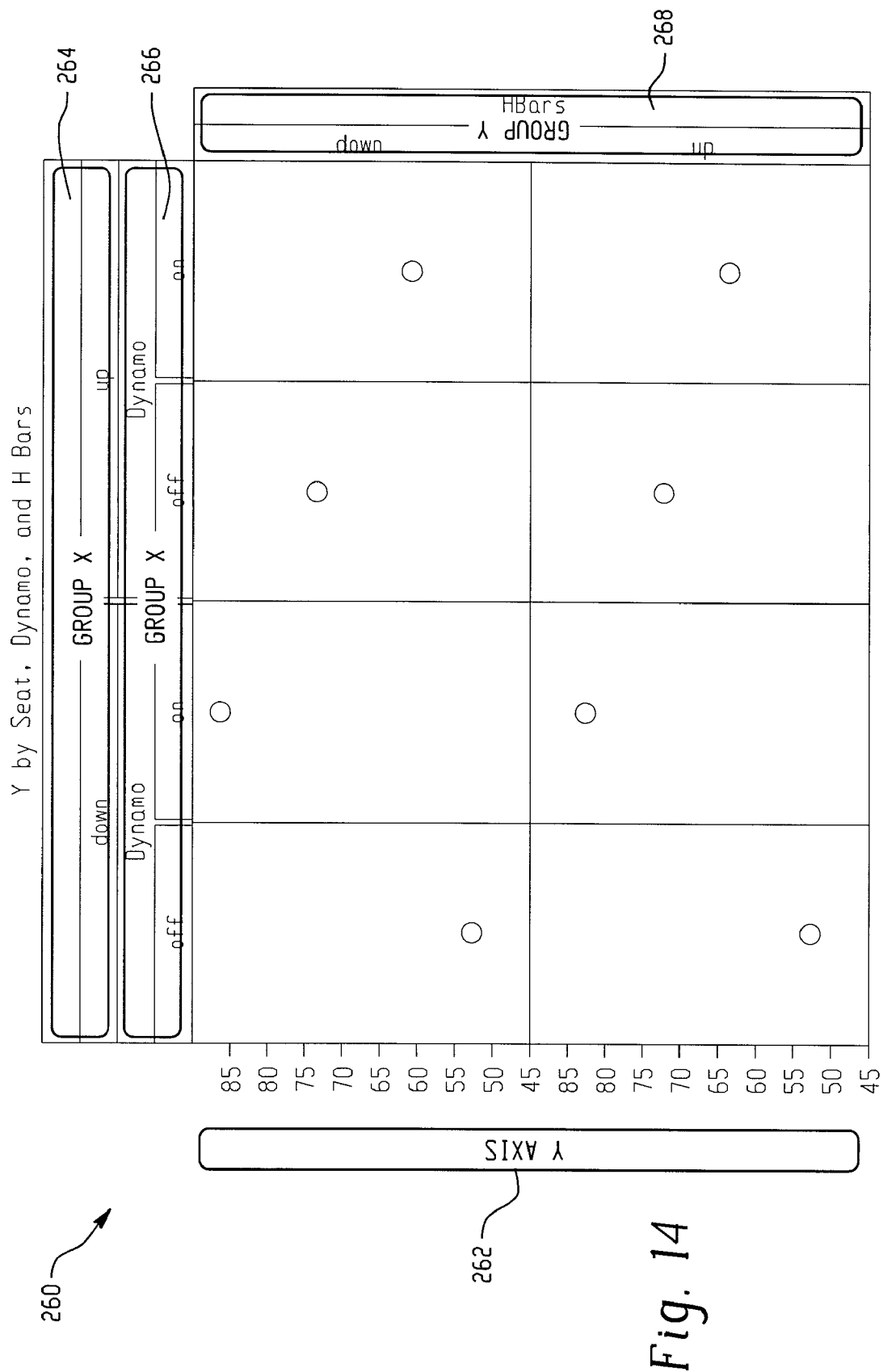
FIG. 14 depicts drag zone hotspots of a graph having one Y variable, two group X variables, and one group Y variable.

FIG. 14 depicts drag zone hotspots of a graph having one Y variable, two group X variables, and one group Y variable. On the graph 260, each graph role having an associated variable becomes a drag zone from which the variable may be dragged and moved to another graph role or removed from the graph 260. For example, the Y position variable associated with the Y-axis may be dragged from the associated drag zone 262. Similarly, the seat variable may be dragged from a first group X drag zone 264, the dynamo variable may be dragged from a second group X drag zone 266, and the hbars variable may be dragged from the group Y drag zone 268.

Figure 15:
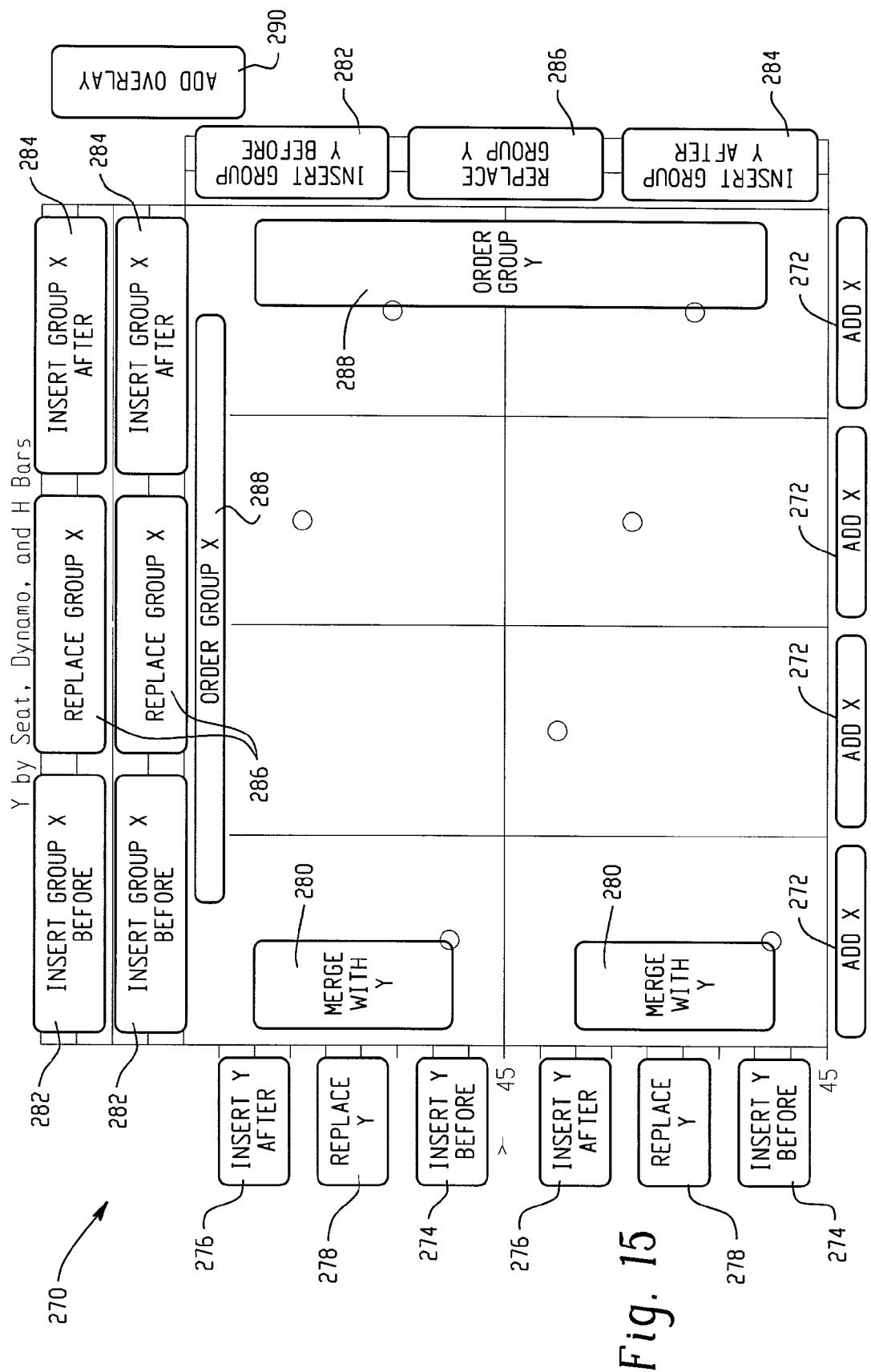
FIG. 15 depicts drop zone hotspots of a graph having one Y variable, two group X variables, and one group Y variable.

FIG. 15 depicts drop zone hotspots of a graph having one Y variable, two group X variables, and one group Y variable. On the graph 270, the X-axis contains add drop zone hotspots 272 based on the non-existence of a variable association. The Y-axis contains insert before 274, insert after 276, replace 278, and merge 280 hotspots based on the prior association of the Y position variable with the Y-axis. The group X and group Y roles include insert before 282, insert after 284, replace 286, and order 288 drop hotspots based on the existence of variable associations, while the overlay hotspot 290 is an add drop zone based on the non-existence of a variable association.

Figure 16:
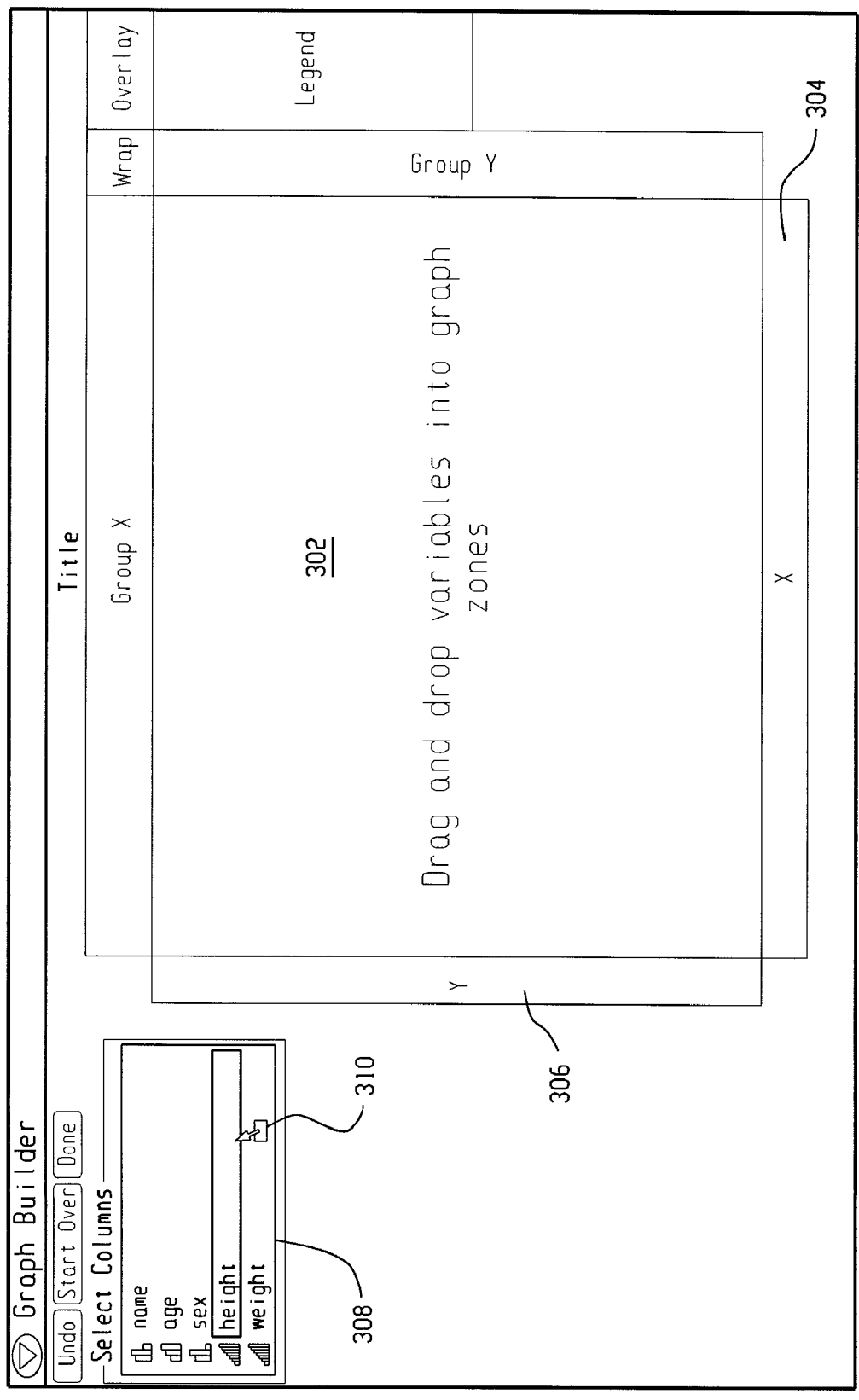
FIG. 16 depicts an initial state of a graph creation display region.

FIGS. 16-38 depict an example walkthrough of graph creation operations using a live feedback drag-and-drop graph builder. FIG. 16 depicts an initial state of a graph creation display region. The graph creation display region 300 includes a graph panel 302, an X-axis 304, a Y-axis 306, and a variable selection region 308. The variable selection region 308 provides a variable bank from which a user may select variables and drag them to graph hotspots to create associations between the variables and graph components associated with the hotspots. A user has selected and begun dragging the height variable from the variable selection region, as indicated at 310.

Figure 17:
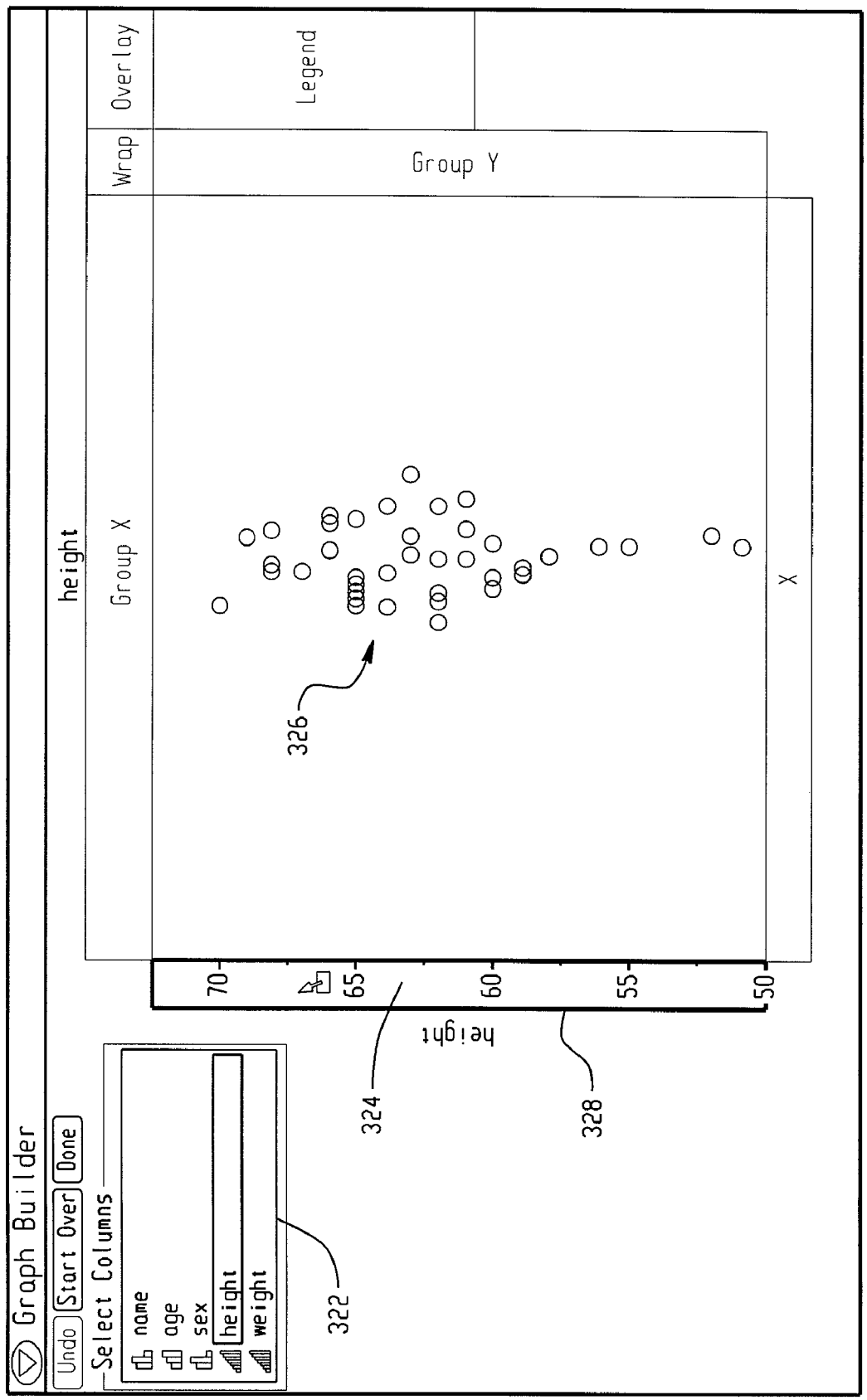
FIG. 17 depicts a graph creation display region following dragging a height variable over a Y-axis hotspot.

FIG. 17 depicts a graph creation display region following dragging a height variable over a Y-axis hotspot. The height variable, selected and dragged from the variable selection region 322 of the graph creation display region 320, is positioned over the Y-axis hotspot 324 through a dragging operation of a user manipulation device, such as a mouse. The live feedback drag-and-drop graph builder provides immediate or near real-time feedback as to what the resulting graph would look like if the association between the height variable and the Y-axis graph display component were made persistent by dropping the height variable on the Y-axis hotspot 324. The live feedback drag-and-drop graph builder plots data 326 as it would be plotted if the height variable were dropped on the Y-axis hotspot 324. The live feedback drag-and-drop graph builder may limit its plotting to a portion of the data if the data is voluminous to improve graph preview generation speed. The live feedback drag-and-drop graph builder may also include a highlight, shown at 328, to clearly identify the new association that is being provisionally made based on the current dragging operation. This highlight may include a change in border, background/foreground color, opacity, or other attributes of the area associated with the graph component.

The preview illustrated in FIG. 17 may be created by including the association between the height variable and the Y-axis graph component in a graph display data structure along with an indicator, such as a bit, denoting the temporary nature of the association. The preview may also be created through use of a temporary graph display data structure that is created upon dragging a variable over a hotspot, where the graph creation display region 320 is modified according to the temporary graph display data structure for the duration of the dragging operation. Upon a dropping operation on a hotspot, a main graph display data structure may be modified to reflect the contents of the temporary graph display data structure. The temporary graph display data structure then may be discarded.

Figure 18:
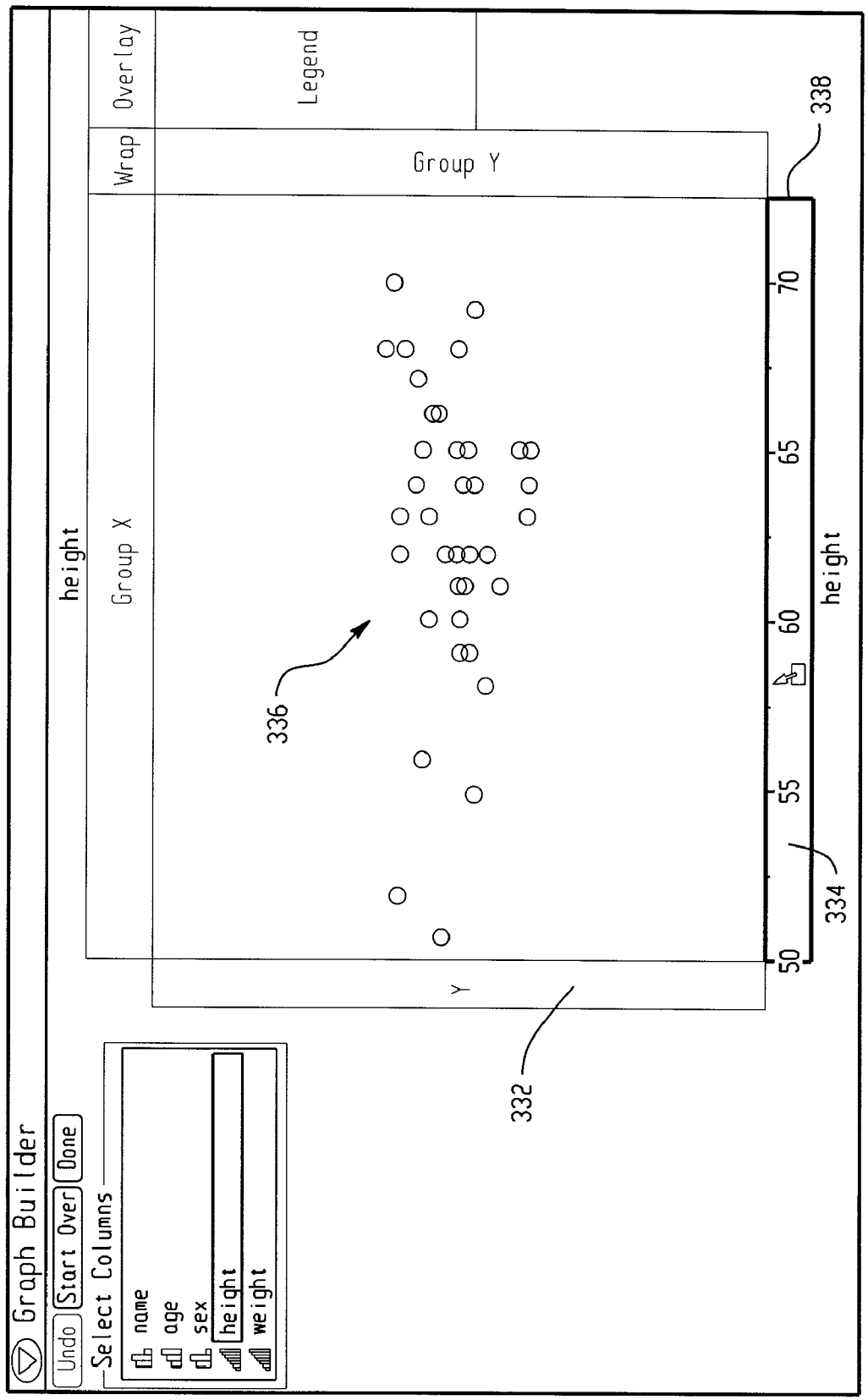
FIG. 18 depicts a graph creation display region following a subsequent dragging of the height variable over an X-axis hotspot.

FIG. 18 depicts a graph creation display region following a subsequent dragging of the height variable over an X-axis hotspot. Upon dragging the height variable off of the Y-Axis hotspot 332, the graph creation display region 330 reverts to its prior state, similar to that depicted in FIG. 16. When the height variable is further dragged onto the X-axis hotspot 334, a temporary association is made between the height variable and the X-axis graph component, such that a preview is generated that plots all or a portion of the height related data 336 as well as highlighting of an area 338 associated with the X-axis component such that a user may easily discern the proposed changes in the graph display if the association between the height variable and the X-axis component were made persistent by dropping the height variable on the X-axis hotspot 334.

Figure 19A:
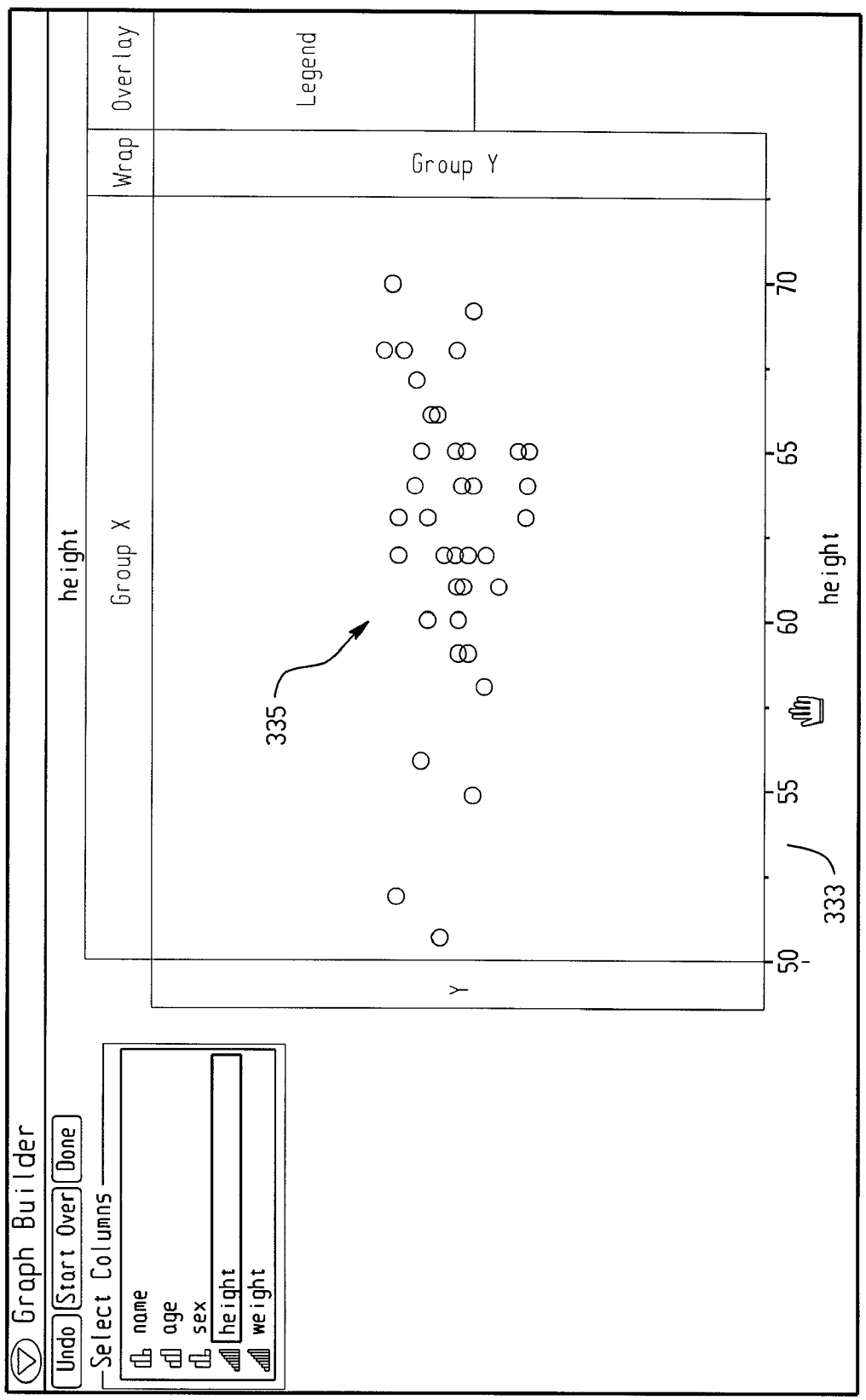

FIG. 19A depicts a graph creation display region following a subsequent dropping of the height variable on the X-axis hotspot. Upon dropping the height variable on the X-axis hotspot 333, the association between the height variable and the X-axis graph component is made persistent. Making the association persistent may be accomplished by removing an indicator of the temporary nature of the association from the graph display data structure, or by copying the association from a temporary graph display data structure to a main graph display data structure. The plotting of the height related data remains, as shown at 335. If only a portion of the height related data was plotted during the preview associated with the dragging operation, then the full set of data may be plotted after dropping the height variable in FIG. 19A. The highlighting, depicted at 338 in FIG. 18, that indicated the temporary nature of the association between the height variable and the X-axis graph component is removed following the drop operation signifying the now persistent nature of the association.

FIG. 19B depicts three tables identifying the state of the graph following the dropping of the height variable on the X-axis hotspot. The first table 337 illustrates the association between the variable, height, and the graph component, X. The first table 337 also illustrates that the association is not of a temporary (tentative) nature. The middle table 339 describes drop zone hotspots that are available on the graph creation display region based upon the associations listed in the first table 337. The association between the height variable and the X-axis graph component makes the insert before, replace, insert after, and merge hotspots appropriate for the X-axis graph component. In contrast, only the add component is appropriate for the Y-axis graph component because of the non-existence of any association with a variable. The third table 331 identifies the set of appropriate element descriptors based on the variable associations of the X-axis and Y-axis graph components. As illustrated on the table of FIG. 6, the association of a continuous variable on the response axis and no variable on the factor axis makes the points, box plot, bar chart, and histogram element descriptors appropriate element descriptors for data display. The third table 331 identifies the points element descriptor as being active. A system may be configured to allow a user to select between the other appropriate element descriptors, such as via a context menu.

Figure 20:
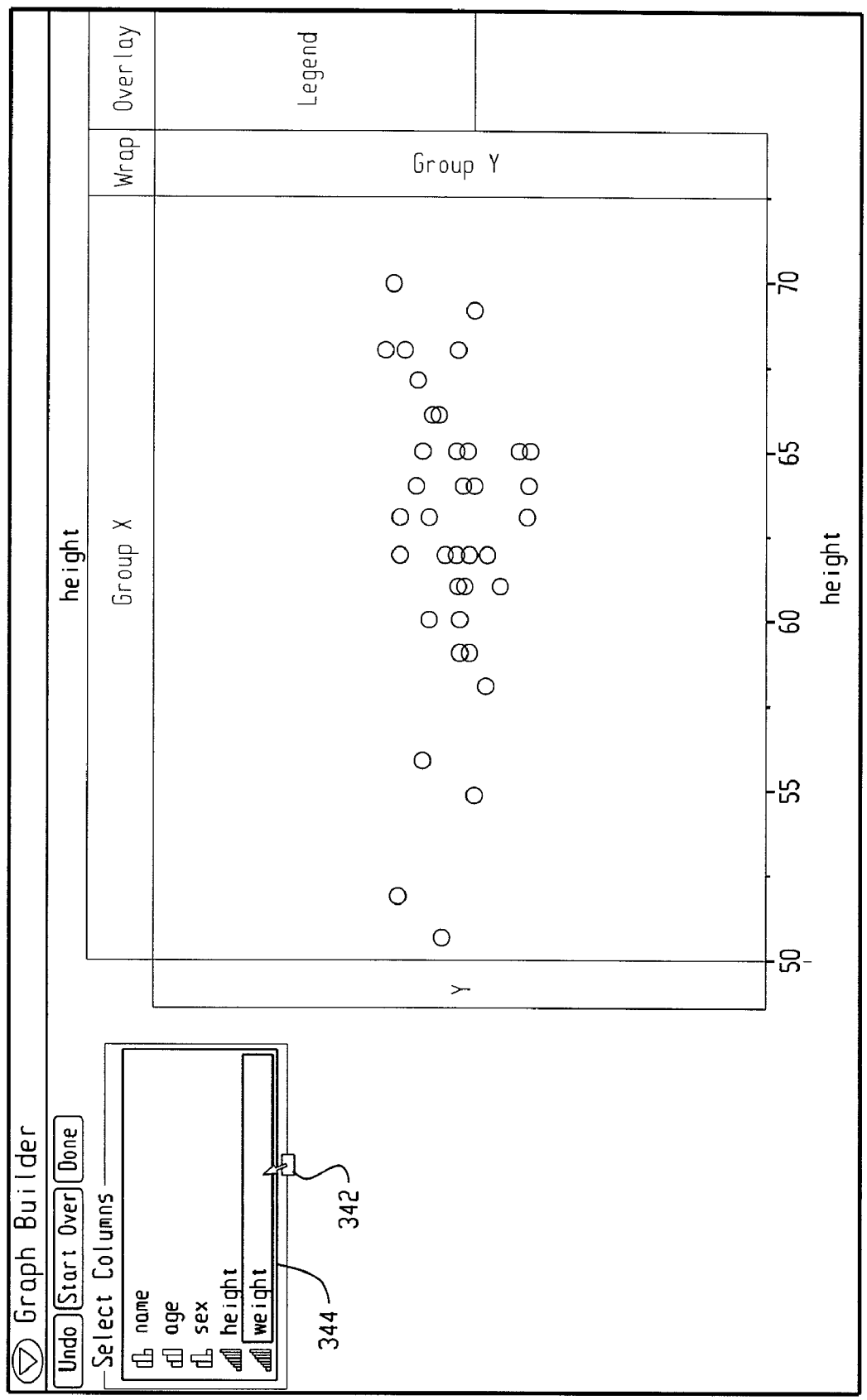
FIG. 20 depicts a graph creation display region during a subsequent selection and dragging of the weight variable from the variable selection region.
Figure 21A:
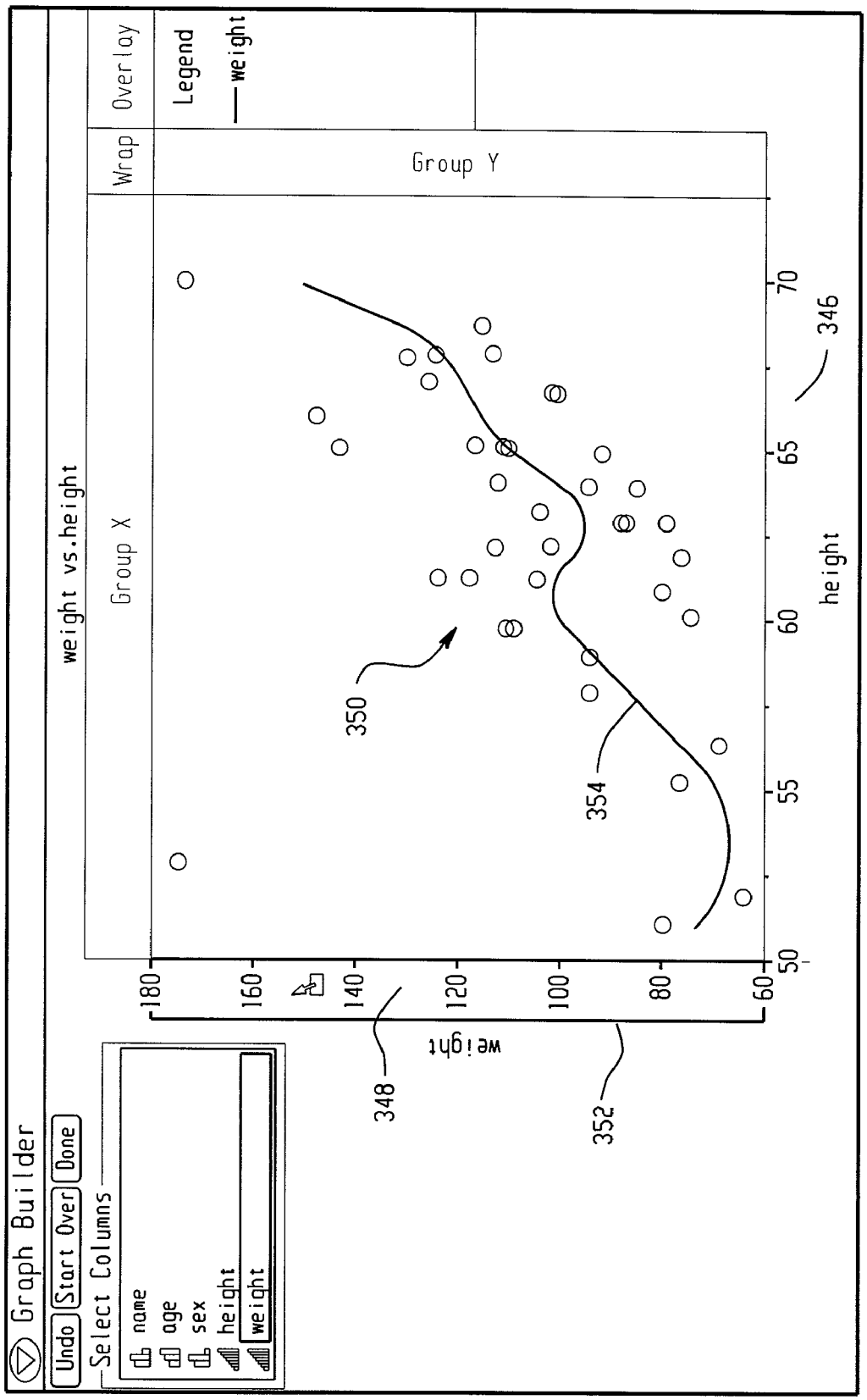

FIG. 20 depicts a graph creation display region 340 during a subsequent selection and dragging of the weight variable 342 from the variable selection region 344. FIG. 21A depicts a graph creation display region following a further dragging of the weight variable to a Y-axis hotspot. Dragging the weight variable over the Y-axis hotspot 348 instructs the live feedback drag-and-drop graph builder to generate a preview of the graph display should the association between the weight variable and the Y-axis graph component be made persistent. The live feedback drag-and-drop graph builder modifies the graph display to plot the data points 350 according to weight and height. A highlight 352 is applied to an area associated with the Y-axis graph component, identifying the temporary nature of the association with the weight variable during the dragging operation. The live feedback drag-and-drop graph builder may also include a smoother plot 354 of height vs. weight upon the association of continuous variables with the axes graph components.

FIG. 21B depicts three tables identifying the state of the graph following the dragging of the weight variable over the Y-axis hotspot. The first graph 356 identifies the associations between variables and graph components. The height variable is associated with the X component, and the weight variable is associated with the Y component. Because the association between the weight variable and the Y graph component is temporary during the dragging operation, an indicator 358 notes that the association is tentative.

The second table 360 identifies drop zone hotspots that are currently available based on existing associations between variables and graph components. Similar to FIG. 19B, the existence of an association between a variable and the X graph component makes the X-axis insert before, replace, insert after, and merge hotspots available. Despite the temporary association between the weight variable and the Y-axis graph component, the Y-axis still only has an add drop hotspot available, as shown at 362. Additional hotspots are not made available until the association is made persistent via a dropping operation, as insert before, replace, insert after, and merge operations would not make sense with relation to the weight variable at FIG. 21. The third table 364 identifies element descriptors that are deemed appropriate by the live feedback drag-and-drop graph builder. Based on the associations of continuous variables with both the X and Y axes, the points, line, smoother, and bar chart element descriptors are deemed appropriate, with the points and smoother descriptors being active by default.

Figure 22:
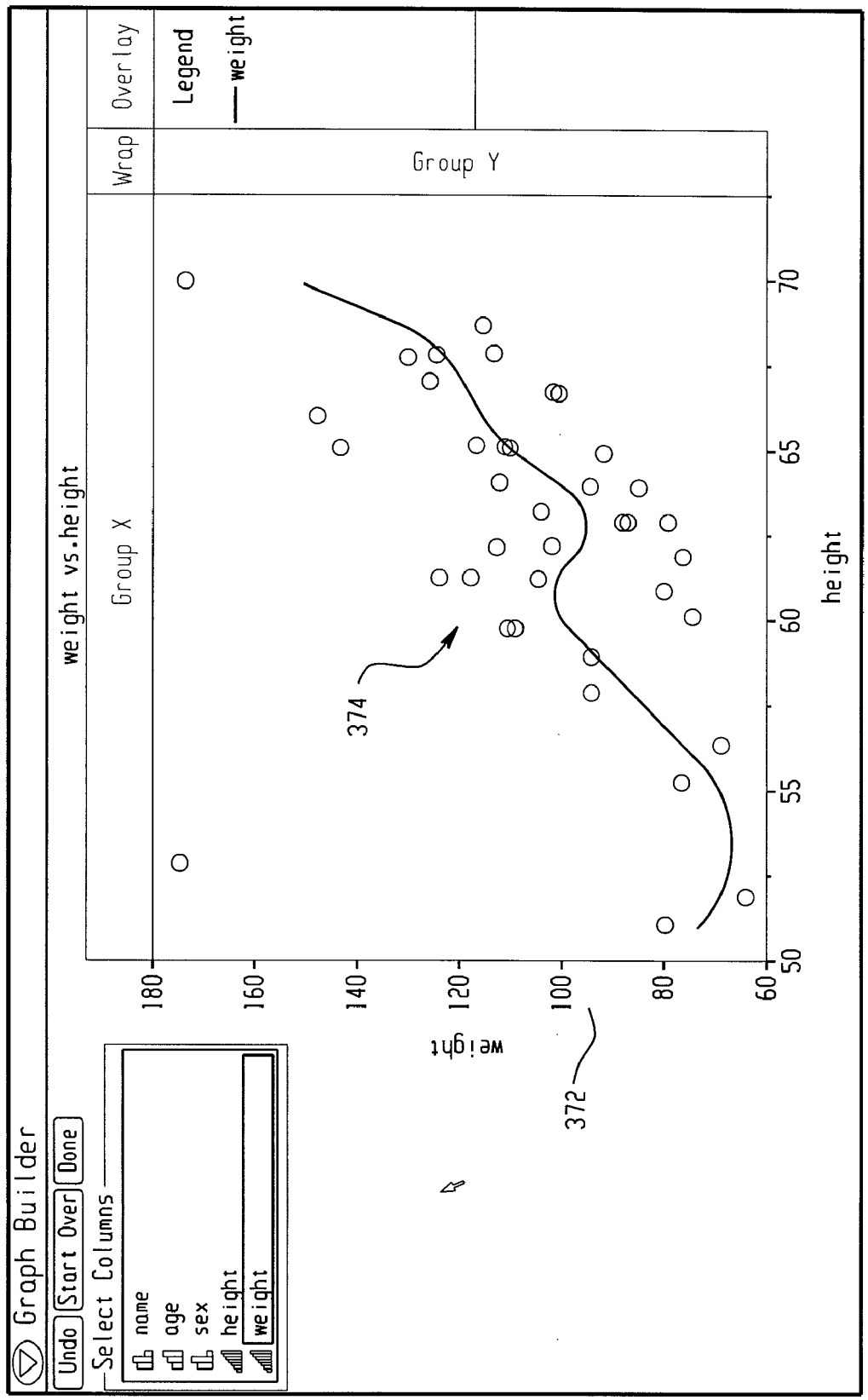
FIG. 22 depicts a graph creation display region following a subsequent dropping of the weight variable on the Y-axis hotspot.

FIG. 22 depicts a graph creation display region following a subsequent dropping of the weight variable on the Y-axis hotspot. Upon dropping the weight variable on the Y-axis hotspot 372 of the graph creation display region 370, the association between the weight variable and the Y-axis graph component is made persistent. The plotting of the weight versus height data remains, as shown at 374. If only a portion of the weight versus height data was plotted during the preview associated with the dragging operation, then the full set of data may be plotted after dropping the weight variable in FIG. 22. The highlighting, depicted at 352 in FIG. 21A, that indicated the temporary nature of the association between the weight variable and the Y-axis graph component is removed following the drop operation signifying the now persistent nature of the association.

Figure 23:
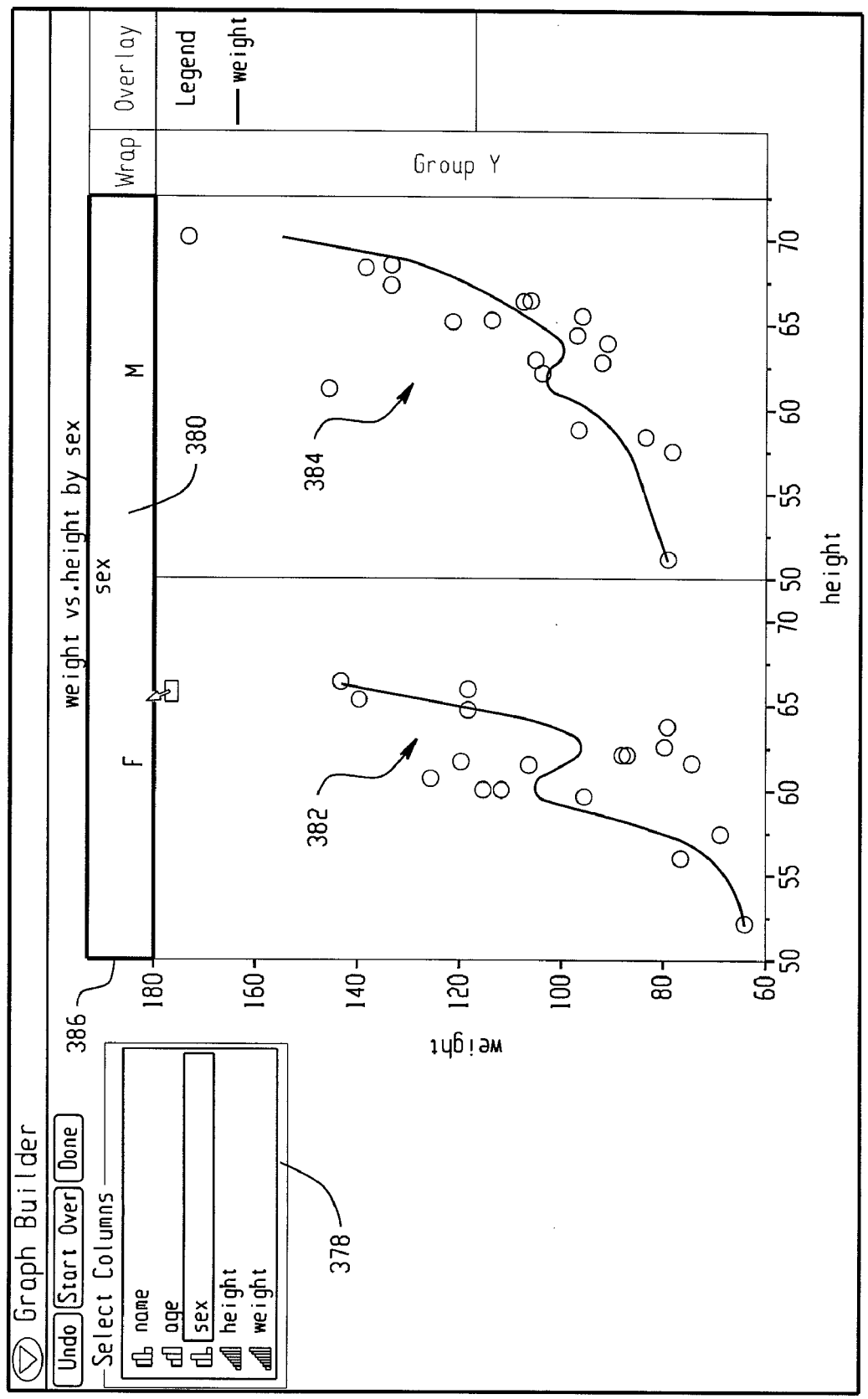
FIG. 23 depicts a graph creation display region during a dragging operation making a temporary association between a sex variable and a group X hotspot.

FIG. 23 depicts a graph creation display region during a dragging operation making a temporary association between a sex variable and a group X hotspot. Following selection of the sex variable from the variable selection region 378 of the graph creation display region 376, the sex variable has been dragged via a user manipulation device over the group X hotspot 380. The live feedback drag-and-drop graph builder is then instructed to create a preview based on the temporary association between the sex variable and the group X graph component. As illustrated in FIG. 23, the temporary association between the sex variable and the group X graph component results in the graph display being split into two graph panels 382, 384, the first 382 depicting female weight versus height data, and the second 384 depicting male weight versus height data. The live feedback drag-and-drop graph builder also provides a highlight 386 of an area associated with the group X graph component to denote that the current association between the sex variable and the group X graph component is temporary in nature.

Figure 24:
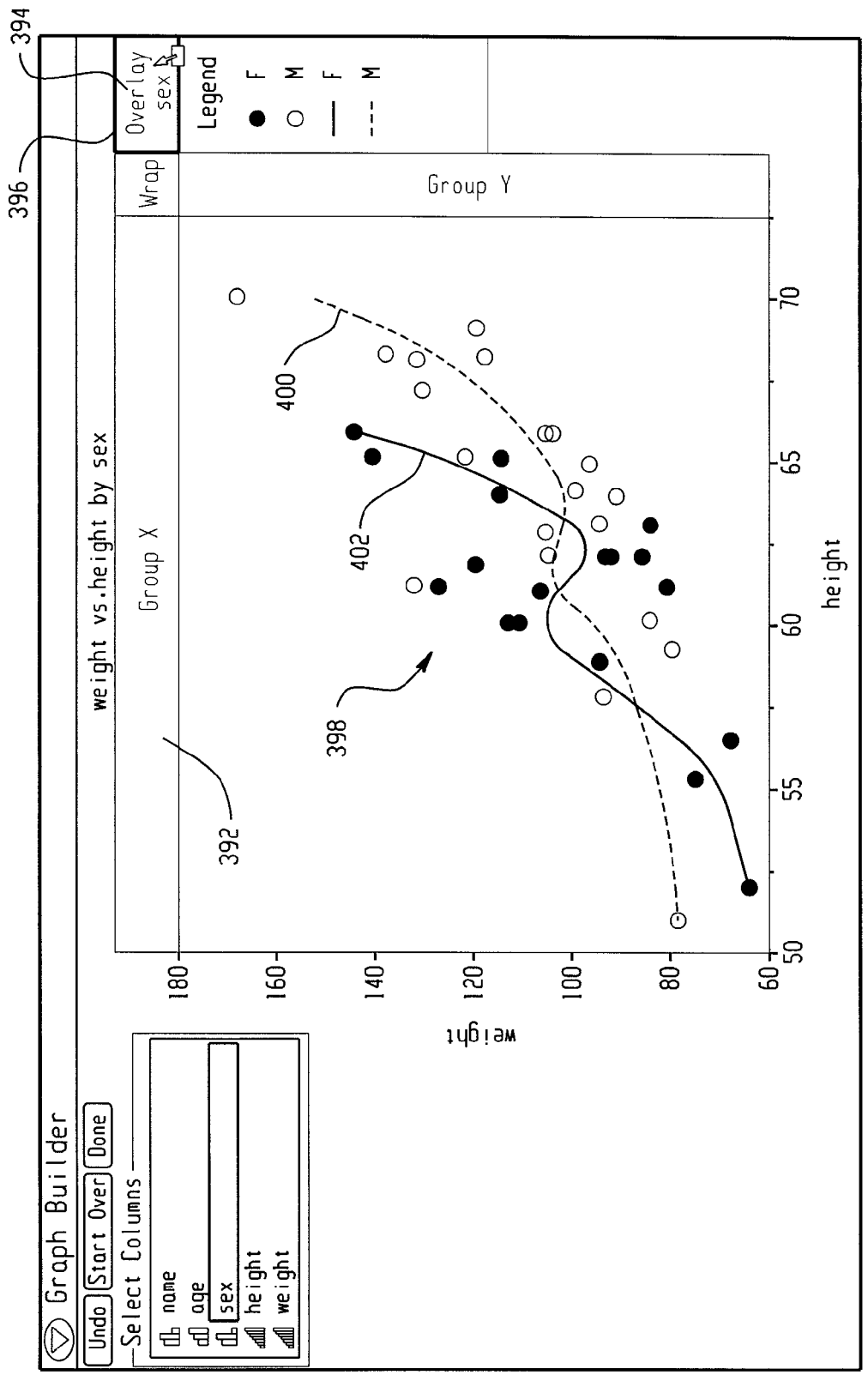
FIG. 24 depicts a graph creation display region during a subsequent dragging of the sex variable to an overlay hotspot.

FIG. 24 depicts a graph creation display region during a subsequent dragging of the sex variable to an overlay hotspot. Dragging the sex variable off of the group X hotspot 392 of the graph creation display region 390 results in a disassociation of the sex variable and the group X graph component. Dragging the sex variable over the overlay hotspot 394 instructs the live feedback drag-and-drop graph calculator to generate a preview of the graph display should a persistent association be made between the sex variable and the overlay graph component. The live feedback drag-and-drop graph builder highlights an area 396 associated with the overlay graph component to denote the temporary nature of the association between the sex variable and the overlay graph component. The live feedback drag-and-drop graph builder plots the male and female weight versus height data points 398 along with smoother lines corresponding to the male weight versus height data 400 and the female weight versus height data 402. The live feedback drag-and-drop graph builder may also plot the weight versus height data points 398 in different colors corresponding to male data points and female data points.

Figure 25:
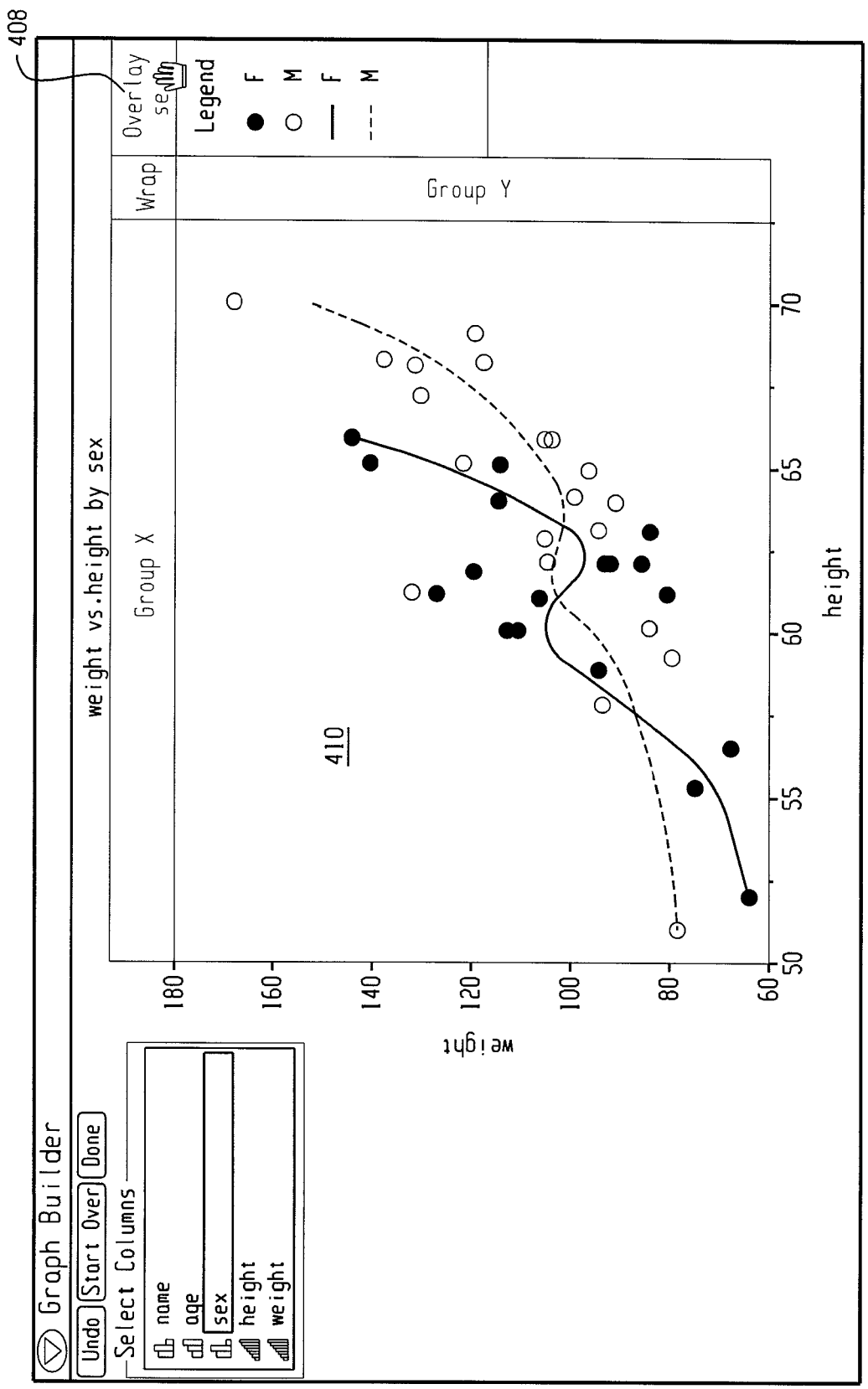
FIG. 25 depicts a graph creation display region following dropping the sex variable on the overlay hotspot.

FIG. 25 depicts a graph creation display region following dropping the sex variable on the overlay hotspot. Upon dropping the sex variable on the overlay hotspot 408 of the graph creation display region 406, the association between the overlay graph component and the sex variable is made persistent. The element descriptor plots on the graph panel 410 are retained, and the highlight of the area corresponding to the overlay graph component is removed to identify the persistent nature of the association between the sex variable and the overlay graph component.

Figure 26:
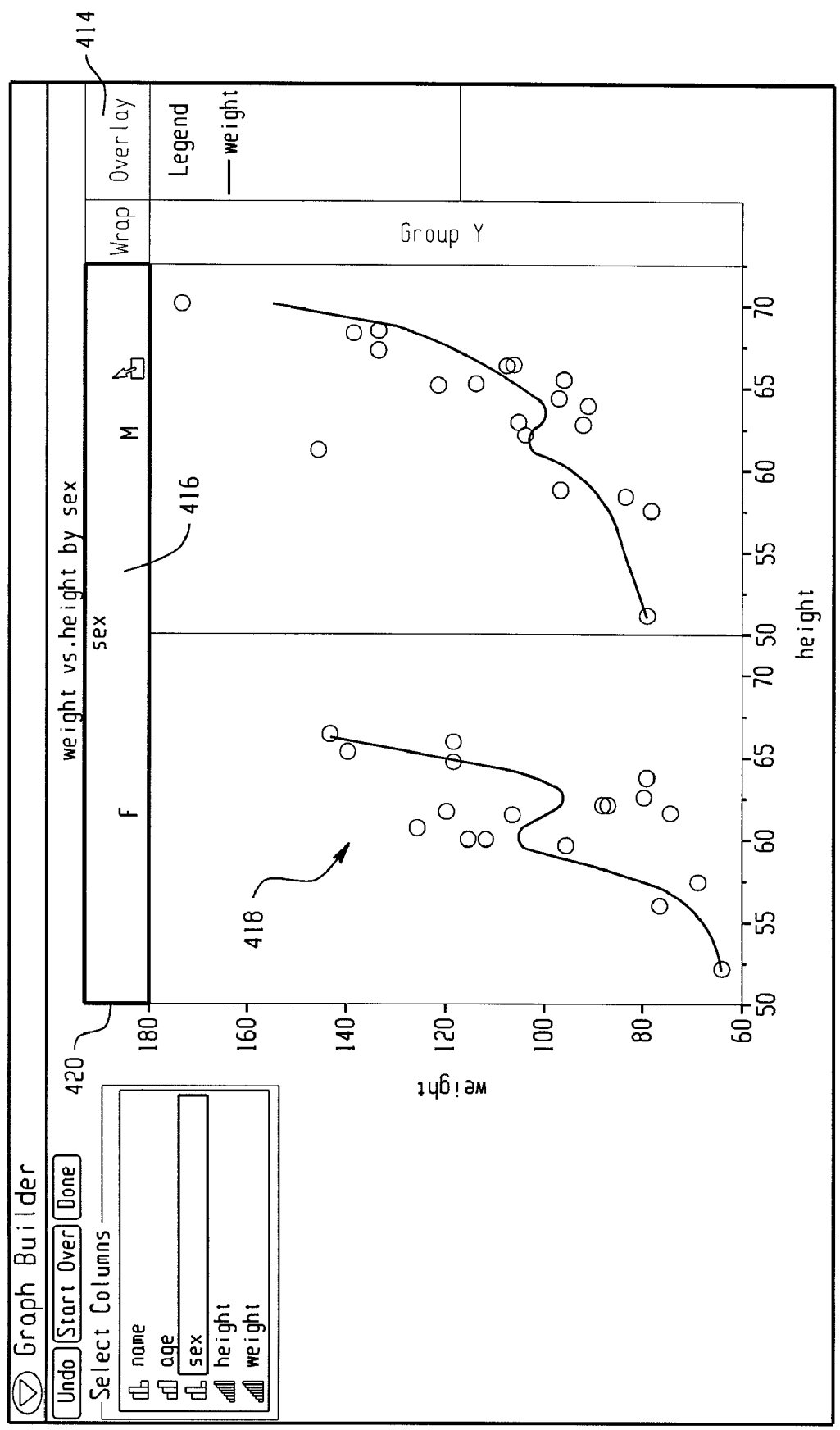
FIG. 26 depicts a graph creation display region following picking up the sex variable from the overlay drag zone hotspot and dragging the sex variable back over the group X drop hotspot.

FIG. 26 depicts a graph creation display region following picking up the sex variable from the overlay drag zone hotspot and dragging the sex variable back over the group X drop hotspot. Dragging the sex variable from the overlay drag hotspot 414 of the graph creation display region 412 disassociates the sex variable from the overlay graph component. Dragging the sex variable over the group X hotspot 416 returns the graph panel preview 418 and highlighting 420 described with respect to FIG. 23, via a temporary association between the sex variable and the group X graph component.

Figure 27:
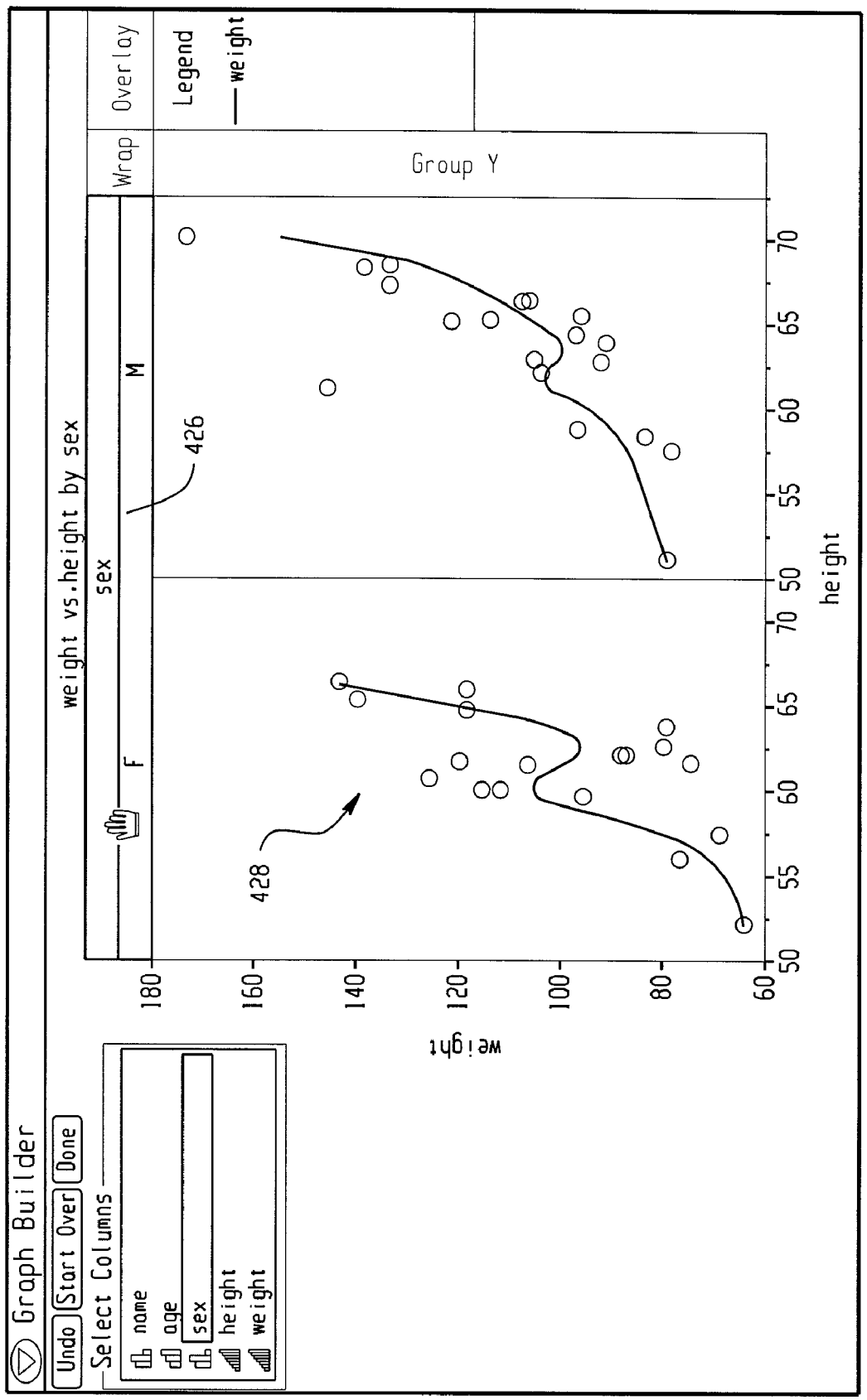
FIG. 27 depicts a graph creation display region following dropping the sex variable on the group X hotspot.

FIG. 27 depicts a graph creation display region following dropping the sex variable on the group X hotspot. Upon dropping the sex variable on the group X hotspot 426 of the graph creation display region 424, the association between the group X graph component and the sex variable is made persistent. The element descriptor plots on the graph panel 428 are retained, and the highlight of the area corresponding to the overlay graph component is removed to identify the persistent nature of the association between the sex variable and the group X graph component.

Figure 28A:
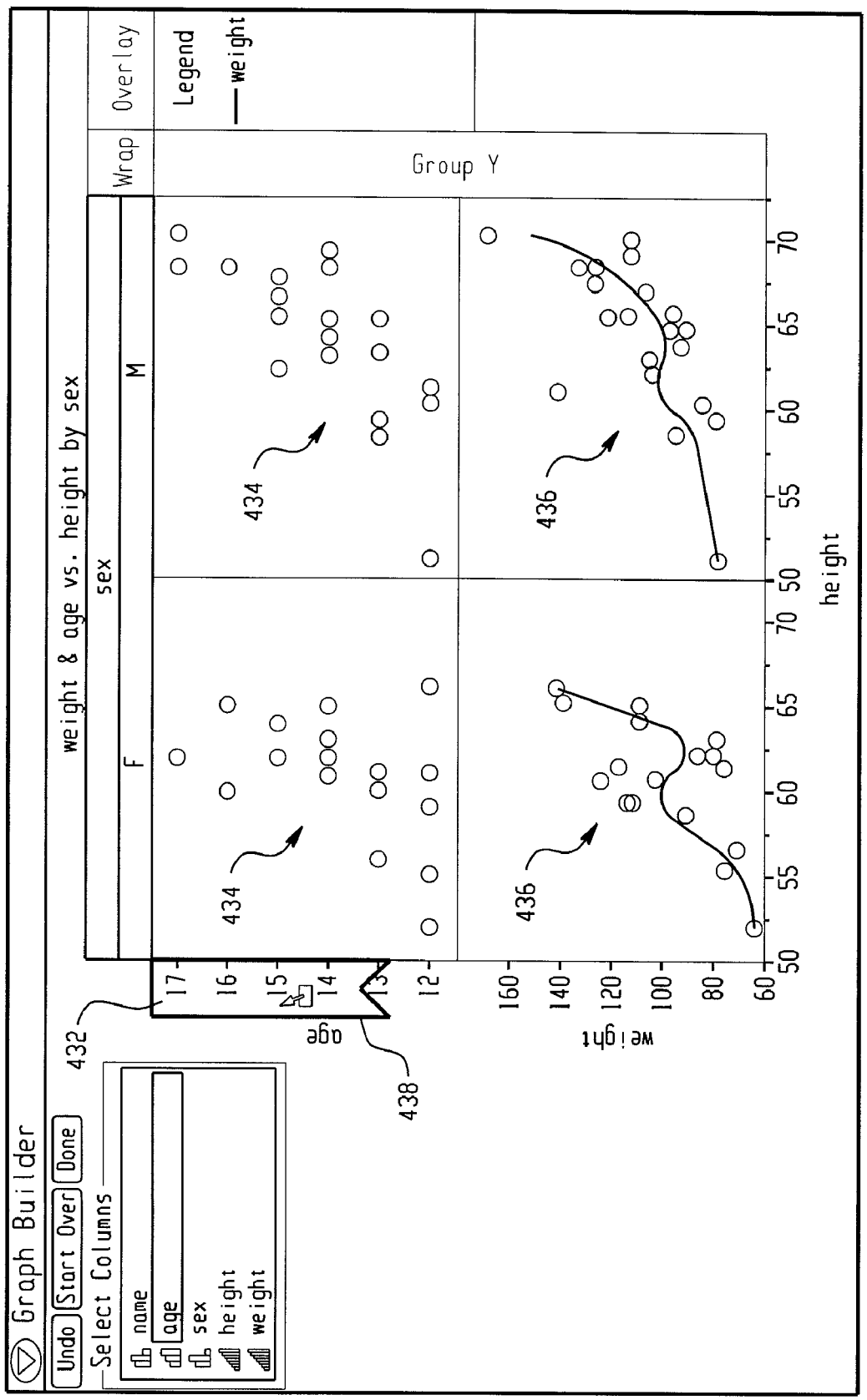

FIG. 28A depicts a graph creation display region following dragging an age variable onto an insert after hotspot on the Y-axis. Dragging the age variable onto the Y-axis insert after hotspot 432 of the graph creation display region 430 creates a temporary association between the age variable and the Y-axis graph component as depicted in the first table 439 of FIG. 28B. The live feedback drag-and-drop graph builder creates a preview of the graph display if the age—Y-axis association was made persistent by presenting a row of age versus height by sex plots 434 above a row of weight versus height by sex plots 436. An area associated with the insert before function of the Y-axis graph component is highlighted, as shown at 438, to identify the temporary nature of the association between the age variable and the Y-axis graph component.

The second table 440 lists the active hotspots contained in the computer-human interface display based on the associations shown in the first table 434. The existence of the height, weight, and sex variables' associations make more hotspot options, such as insert before, insert after, and replace, appropriate when compared to the group Y graph component having no variable associations and only an add hotspot. The third table 442 identifies element descriptors deemed appropriate based upon the types of variables associated with the X and Y axes.

Figure 29:
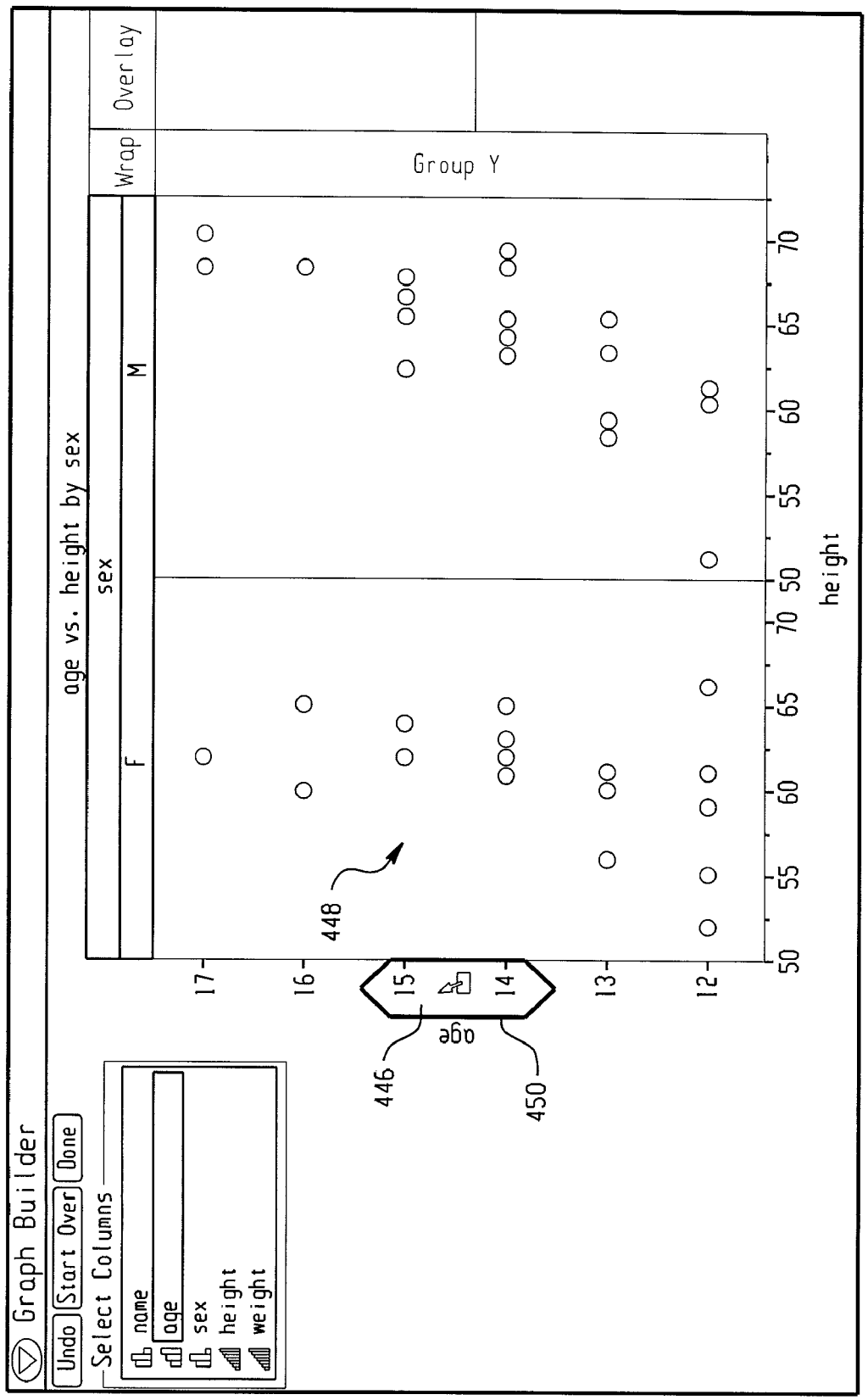
FIG. 29 depicts a graph creation display region during a subsequent dragging of the age variable over a replace hotspot associated with the Y-axis graph component.

FIG. 29 depicts a graph creation display region during a subsequent dragging of the age variable over a replace hotspot associated with the Y-axis graph component. Dragging the age variable over the Y-axis replace hotspot 446 of the graph creation display region 444 results in a temporary association between the age variable and the Y-axis graph component. The live feedback drag-and-drop graph builder provides a preview of the graph display should this association be made permanent by displaying an age versus height by sex plot at 448. A region 450 associated with the Y-axis graph component replace function is highlighted to depict the temporary nature of the association between the age variable and the Y-axis graph component. The prior association between the weight variable and the Y-axis graph component may be retained so that the display may revert should the association between the age variable and the Y-axis graph component not be made persistent. This may be accomplished by allowing the age—Y-axis association having a temporary indicator supersede the persistent weight association during preview creation, or if a temporary graph display data structure is utilized, then the weight association may be retained in the main graph display data structure while the age association is stored in the preview-generating temporary graph display data structure during the dragging operation.

Figure 30:
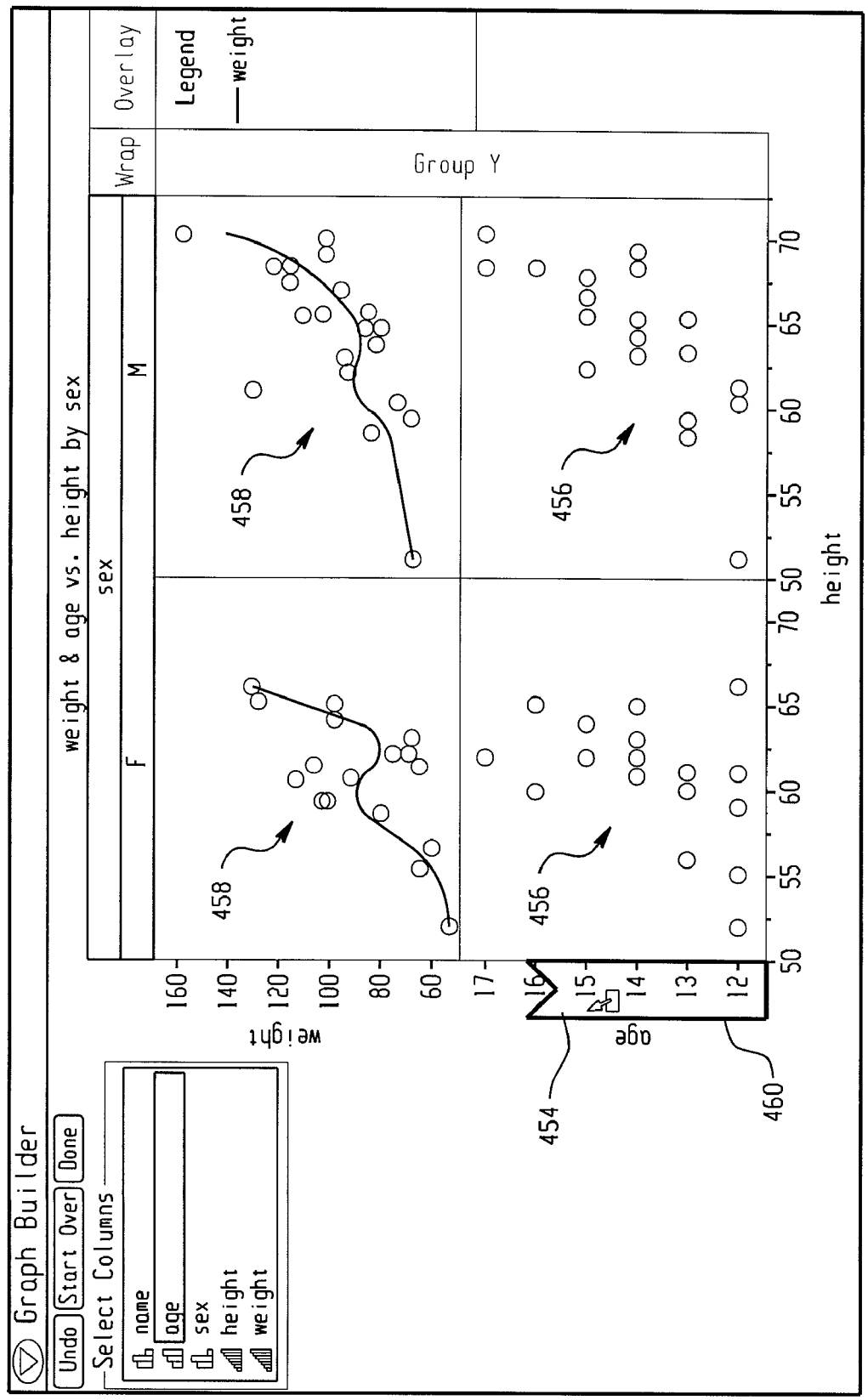
FIG. 30 depicts a graph creation display region following dragging the age variable onto an insert before hotspot on the Y-axis.

FIG. 30 depicts a graph creation display region following dragging the age variable onto an insert before hotspot on the Y-axis. Dragging the age variable onto the Y-axis insert before hotspot 454 of the graph creation display region 452 creates a temporary association between the age variable and the Y-axis graph component. The live feedback drag-and-drop graph builder creates a preview of the graph display if the age—Y-axis association was made persistent by presenting a row of age versus height by sex plots 456 below a row of weight versus height by sex plots 458. An area associated with the insert after function of the Y-axis graph component is highlighted, as shown at 460, to identify the temporary nature of the association between the age variable and the Y-axis graph component.

Figure 31:
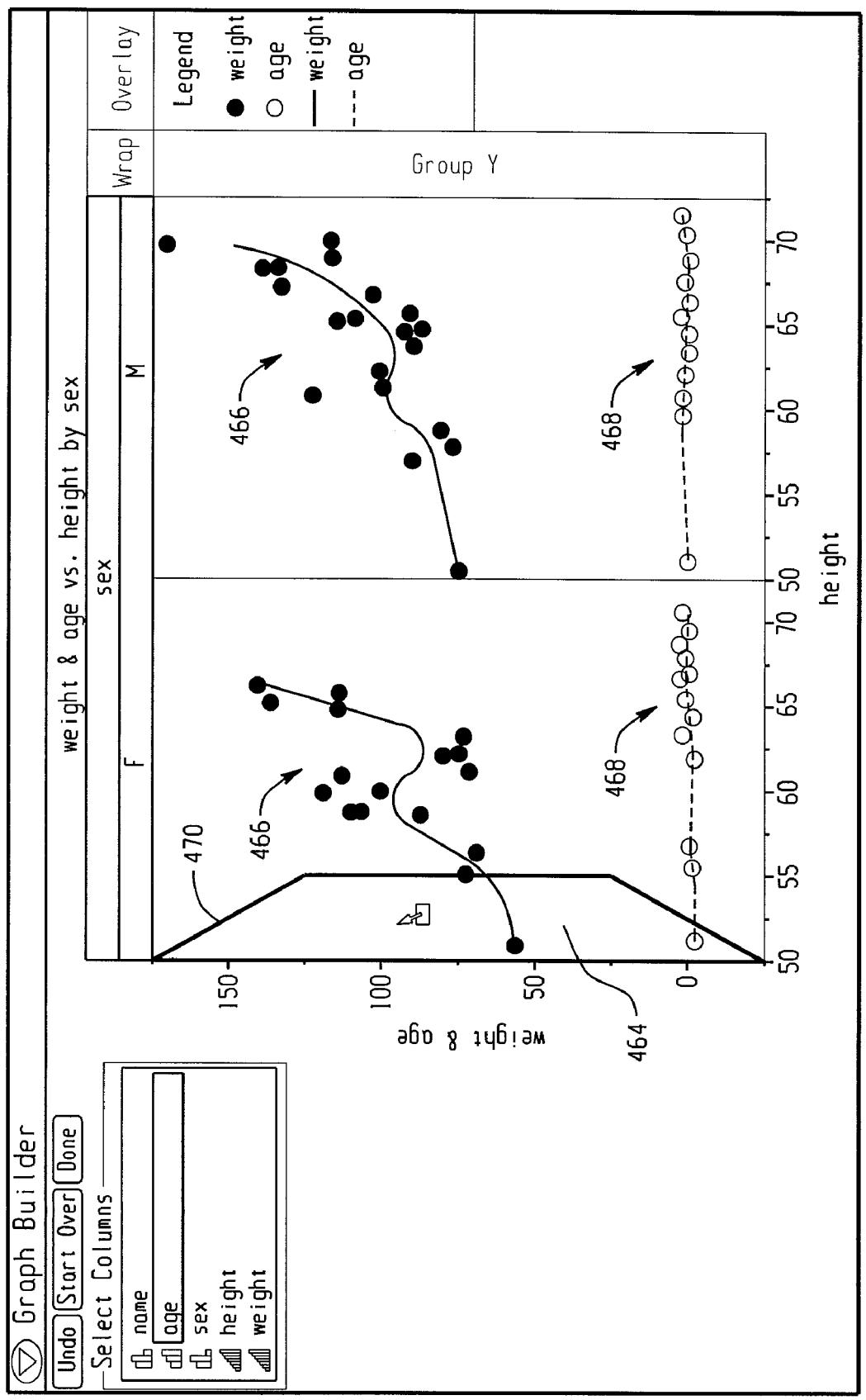
FIG. 31 depicts a graph creation display region following dragging the age variable onto a merge hotspot on the Y-axis.

FIG. 31 depicts a graph creation display region following dragging the age variable onto a merge hotspot on the Y-axis. Dragging the age variable over the merge hotspot 464 of the graph creation display region 462 instructs the live feedback drag-and-drop graph builder to generate a preview showing what the graph display would show if the association between the age variable and the Y-axis component were made persistent. The live feedback drag-and-drop graph builder provides weight versus height by sex plots 466 as well as age versus height by sex plots 468 on the same Y-axis scaling. An area associated with the Y-axis merge function is highlighted, as shown at 470, to depict the temporary nature of the relationship between the age variable and the Y-axis via the merge hotspot 464.

Figure 32:
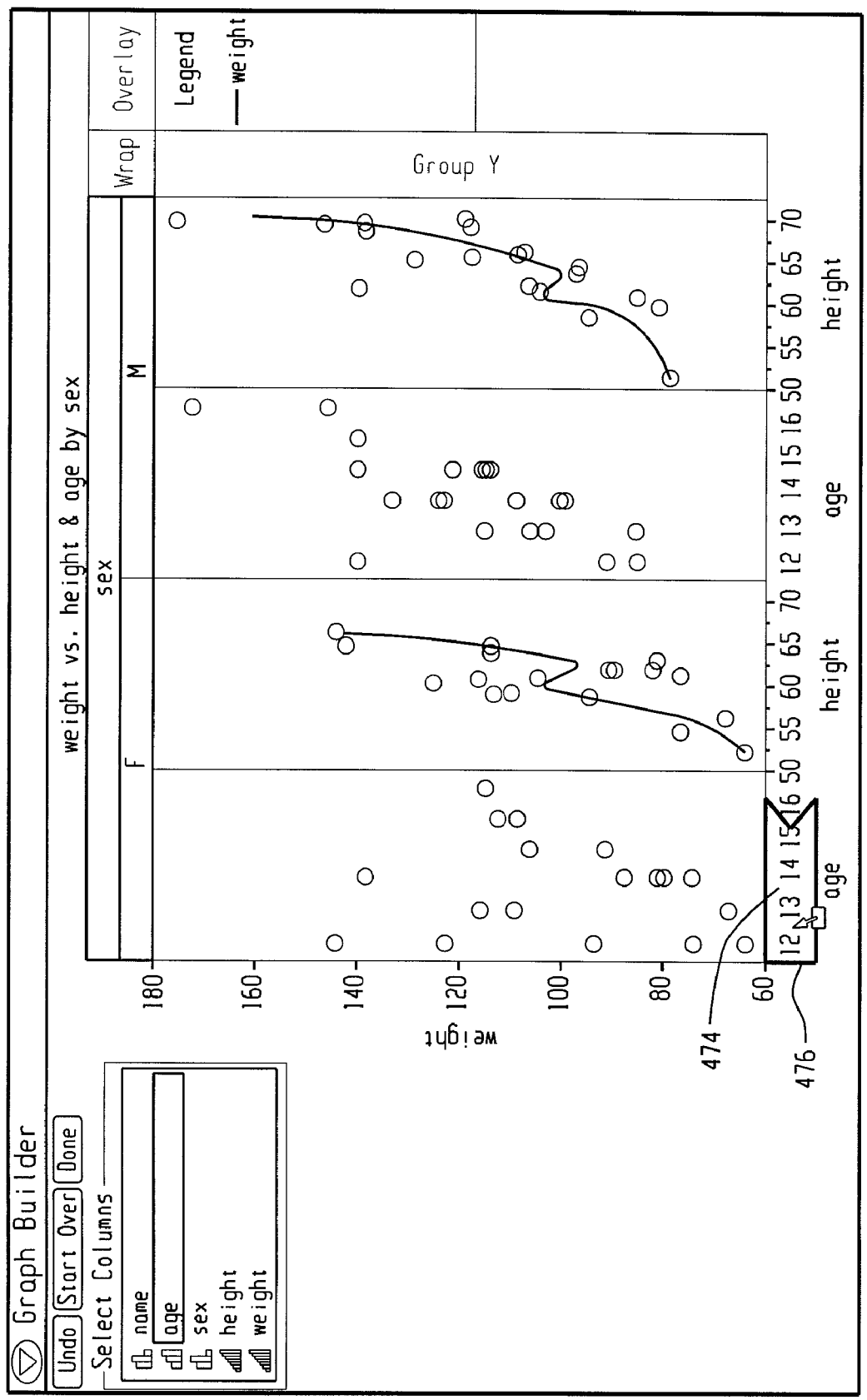
FIG. 32 depicts a graph creation display region following dragging the age variable onto an insert before hotspot on the X-axis.

FIG. 32 depicts a graph creation display region following dragging the age variable onto an insert before hotspot on the X-axis. Dragging the age variable over the insert before hotspot 474 of the graph creation display region 472 instructs the live feedback drag-and-drop graph builder to generate a preview showing the graph display with an association between the age variable and the X-axis component. A weight versus height and age by sex plot is provided along with highlighting 476 identifying the temporary nature of the relationship between the X-axis and the age variable.

Figure 33:
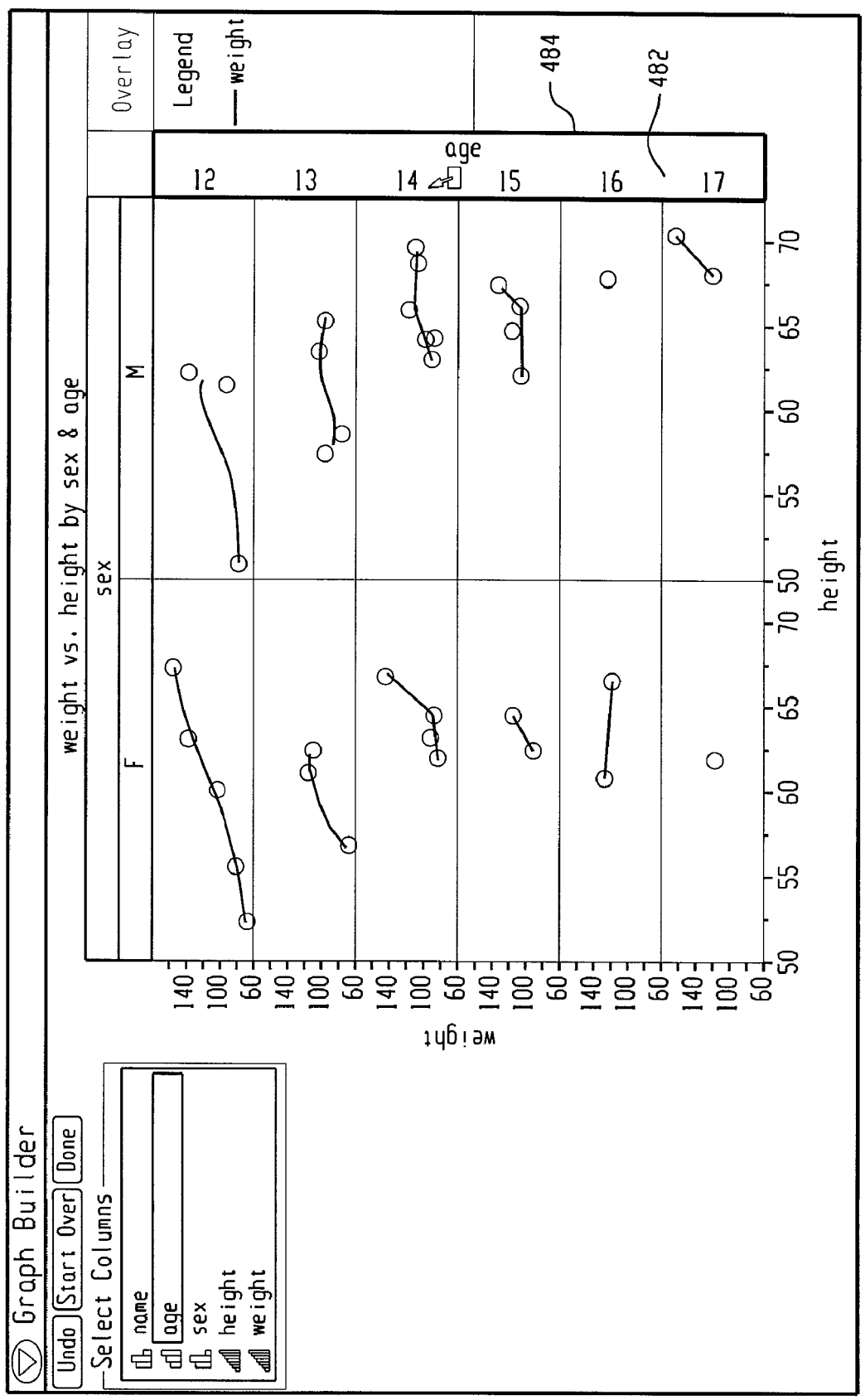
FIG. 33 depicts a graph creation display region following a subsequent dragging of the age variable onto the group Y hotspot 482.

FIG. 33 depicts a graph creation display region following a subsequent dragging of the age variable onto the group Y hotspot 482. Dragging the age variable onto the group Y hotspot 482 of the graph creation display region 480 generates a preview that divides the graph creation display region horizontally into a plurality of sub-graphs, where each row represents a single age or group of ages. The live feedback drag-and-drop graph builder also highlights an area 484 associated with the group Y graph component to identify the association between the age variable and the group Y graph component as being temporary.

Figure 34:
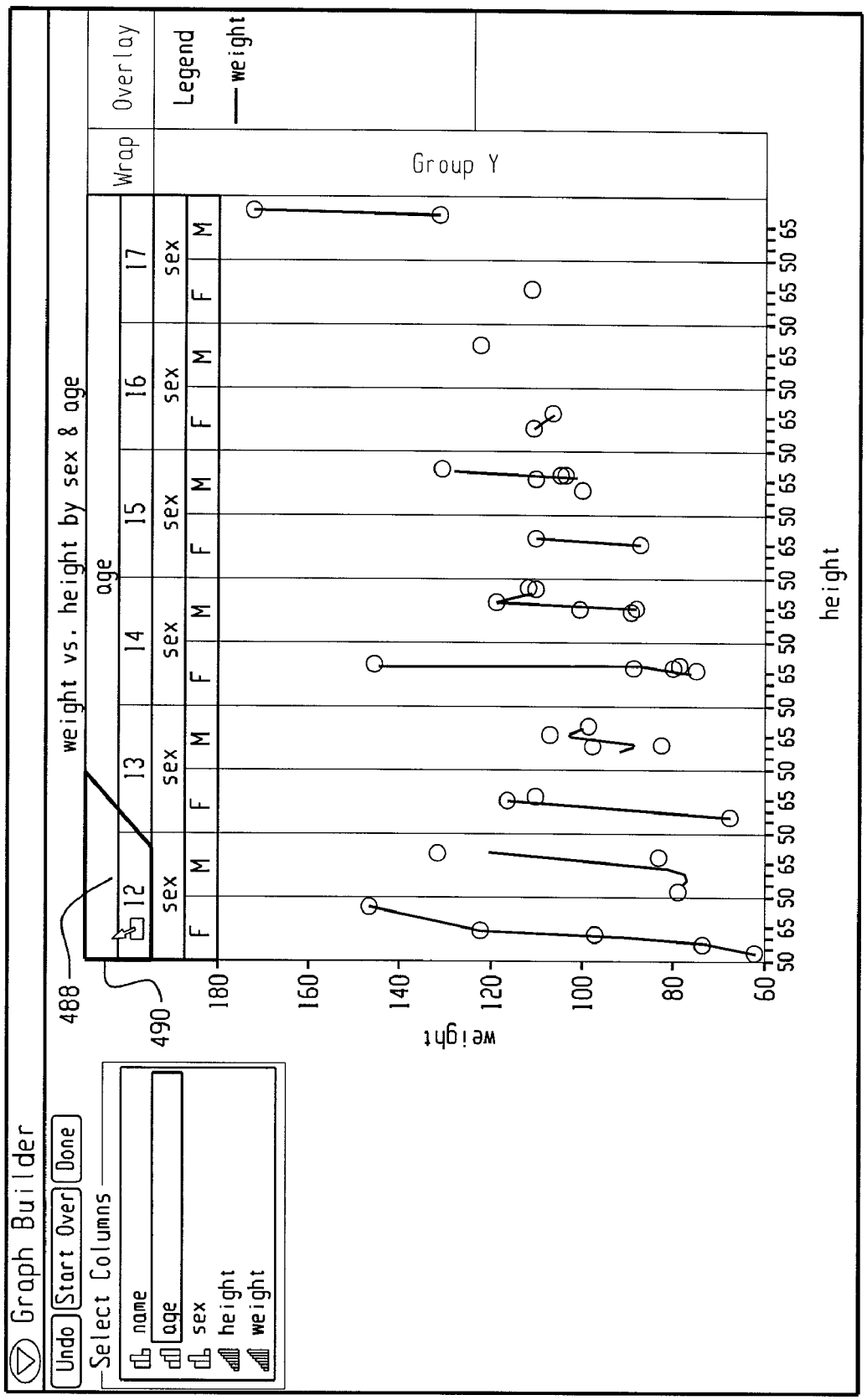
FIG. 34 depicts a graph creation display region following a dragging of the age variable onto the insert before group X hotspot.

FIG. 34 depicts a graph creation display region following a dragging of the age variable onto the insert before group X hotspot. Dragging the age variable onto the insert before group X hotspot 488 of the graph creation display region 486 generates a temporary association between the group X graph component and the age variable, such that the graph creation display region is divided vertically into a plurality of sub-graphs by age and then by sex. The live feedback drag-and-drop graph builder also provides a highlighting of an area 490 associated with the group X insert before command to identify the association between the age variable and the group X graph component as being temporary.

Figure 35:
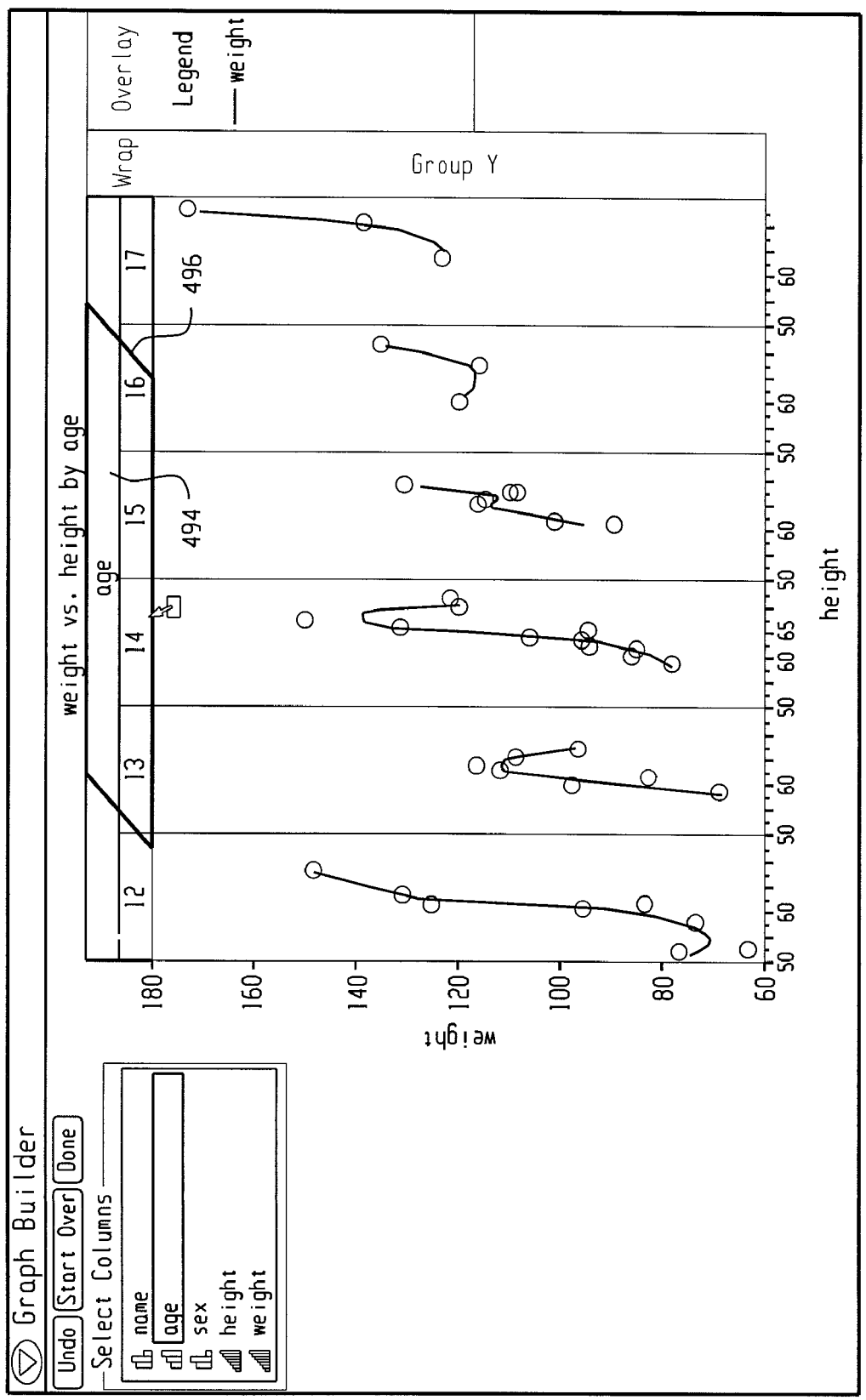
FIG. 35 depicts a graph creation display region following a dragging of the age variable onto the group X replace hotspot.

FIG. 35 depicts a graph creation display region following a dragging of the age variable onto the group X replace hotspot. Dragging the age variable over the group X replace hotspot 494 of the graph creation display region 492 creates a temporary association between the group X graph component and the age variable. The previous association between the group X graph component and the sex variable may be retained so that the live feedback drag-and-drop graph builder may revert the graph should the association between the age variable and the group X graph component not be made persistent through a dropping operation. The live feedback drag-and-drop graph builder provides a preview that divides the graph creation display region vertically into a plurality of sub-graphs depicting different age values. A highlighting is also applied to an area 496 associated with the group X replace function identifying the temporary nature of the association between the age variable and the group X graph component.

Figure 36:
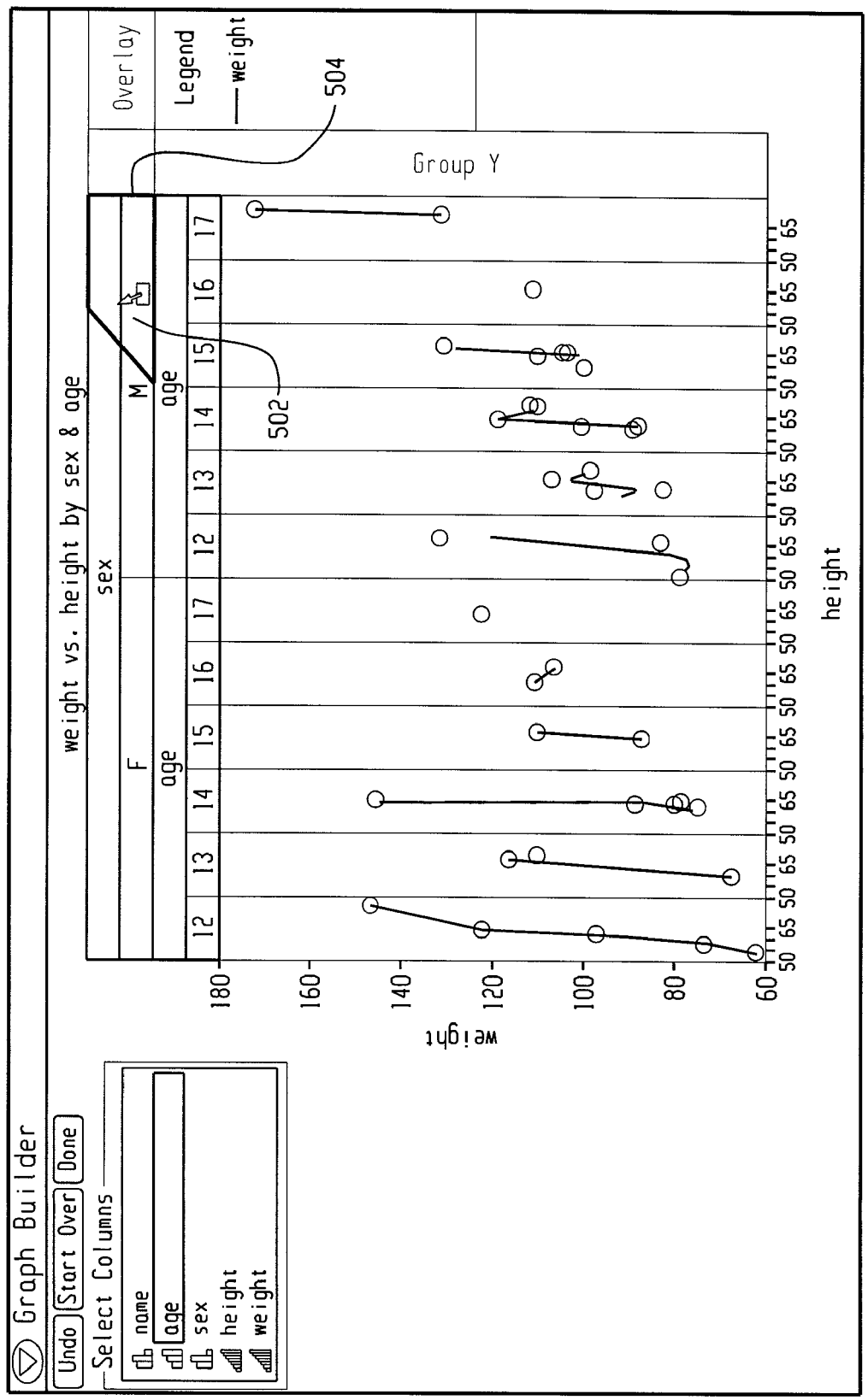
FIG. 36 depicts a graph creation display region following a dragging of the age variable over the group X insert after hotspot.

FIG. 36 depicts a graph creation display region following a dragging of the age variable over the group X insert after hotspot. Dragging the age variable over the group X insert after hotspot 502 of the graph creation display region 500 creates a temporary association between the age variable and the group X graph component. The live feedback drag-and-drop graph builder generates a preview illustrating what the graph display would show if the association was made persistent. The graph panel is divided vertically into a plurality of sub-graphs according to sex and then to age. An area 504 associated with the group X insert after function is highlighted to depict the temporary nature of the association between the age variable and the group X graph component.

Figure 37:
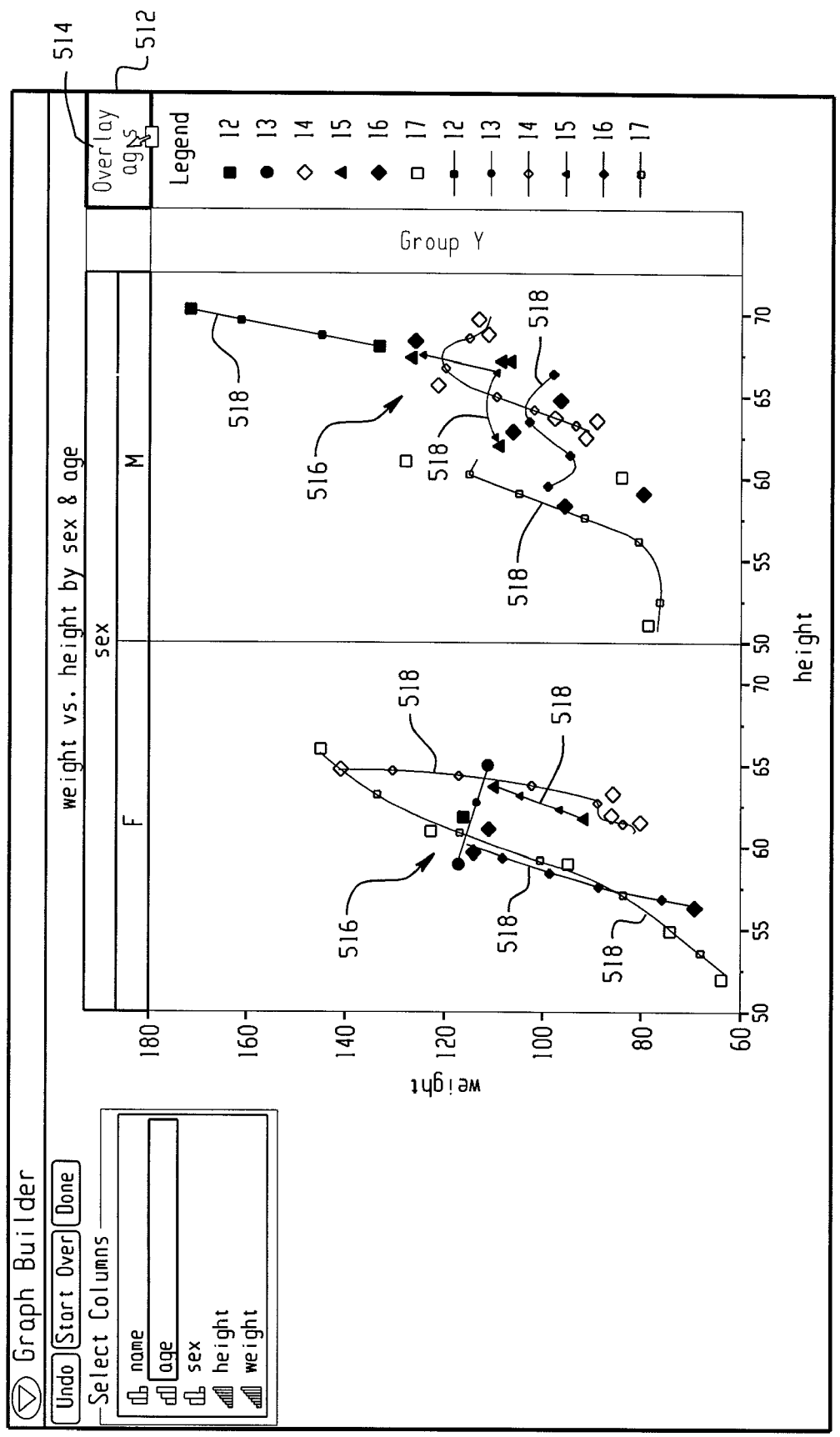
FIG. 37 depicts a graph creation display region following a dragging of the age variable over the overlay hotspot.

FIG. 37 depicts a graph creation display region following a dragging of the age variable over the overlay hotspot. Dragging the age variable over the overlay hotspot 512 of the graph creation display region 510 instructs the live feedback drag-and-drop graph calculator to generate a preview of the graph display should a persistent association be made between the age variable and the overlay graph component. The live feedback drag-and-drop graph builder highlights an area 514 associated with the overlay graph component to denote the temporary nature of the association between the age variable and the overlay graph component. The live feedback drag-and-drop graph builder plots the individual age weight versus height data points 516 along with smoother lines 518 corresponding to the each age's weight versus height data. The live feedback drag-and-drop graph builder may also plot the weight versus height data points 516 in different colors corresponding to each age's data points.

Figure 38:
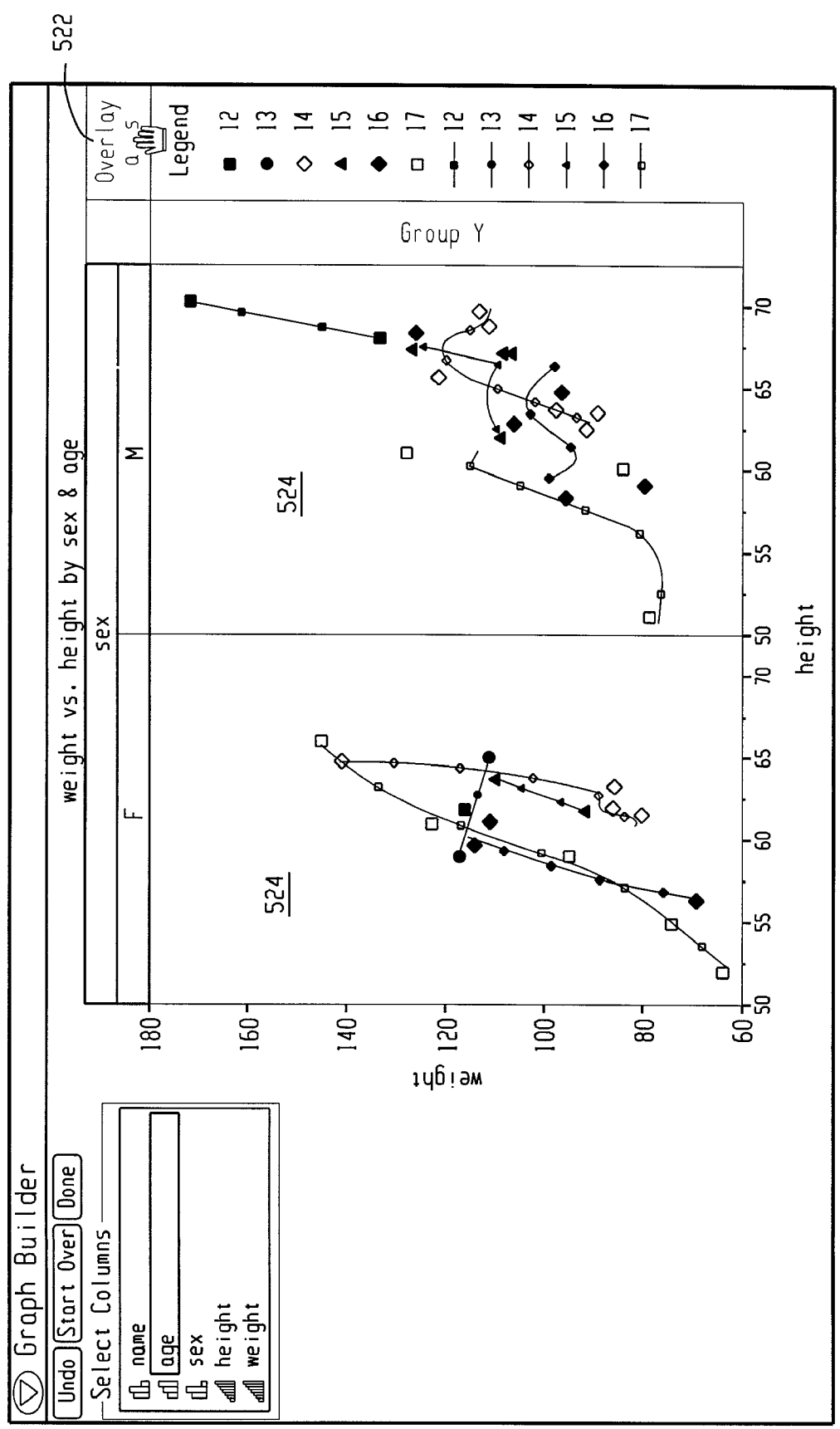
FIG. 38 depicts a graph creation display region following dropping the age variable on the overlay hotspot.

FIG. 38 depicts a graph creation display region following dropping the age variable on the overlay hotspot. Upon dropping the age variable on the overlay hotspot 522 of the graph creation display region 520, the association between the overlay graph component and the age variable is made persistent. The element descriptor plots on the graph panels 524 are retained, and the highlight of the area corresponding to the overlay graph component is removed to identify the persistent nature of the association between the age variable and the overlay graph component.

Figure 39:
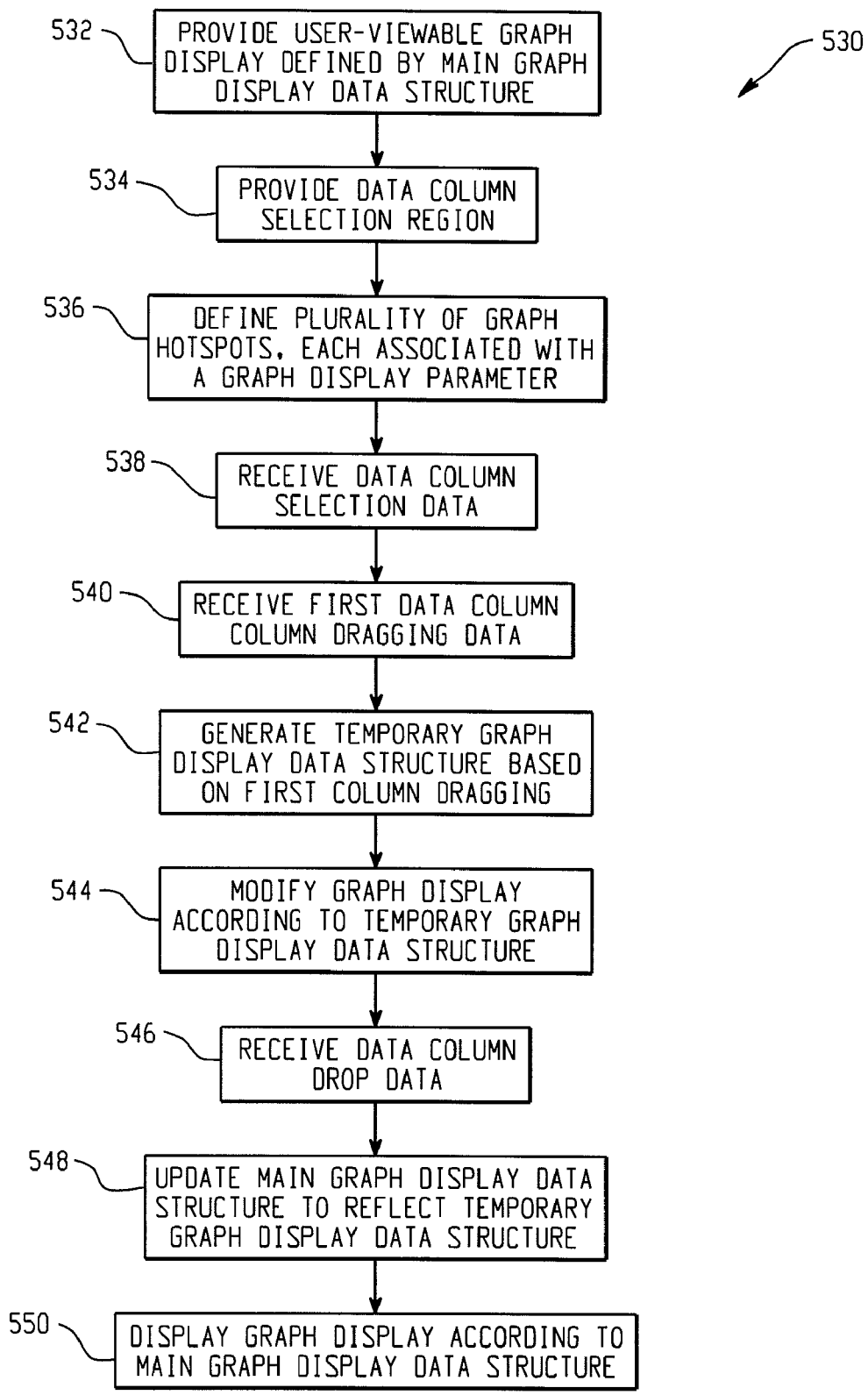
FIG. 39 depicts a computer-implemented method for providing immediate or near real-time graph data feedback to a user during a drag-and-drop graph display creation process.

FIG. 39 depicts a computer-implemented method for providing immediate or near real-time graph data feedback to a user during a drag-and-drop graph display creation process. In the computer-implemented method 530, a user is provided with a user-viewable graph display defined by a main graph display data structure at 532. At 534, a data column selection region is provided, and at 536 a plurality of graph hotspots, each associated with a graph display parameter, are defined. Data column selection data is received at 538 along with first data column dragging data at 540. A temporary graph display data structure is generated based on the first column dragging at 542, and the graph display is modified according to the temporary graph display data structure at 544. Column drop data is received at 546, the main graph display data structure is updated to reflect the contents of the temporary graph display data structure at 548, and at 550, the graph display is displayed according to the main graph display data structure.

Figure 40:
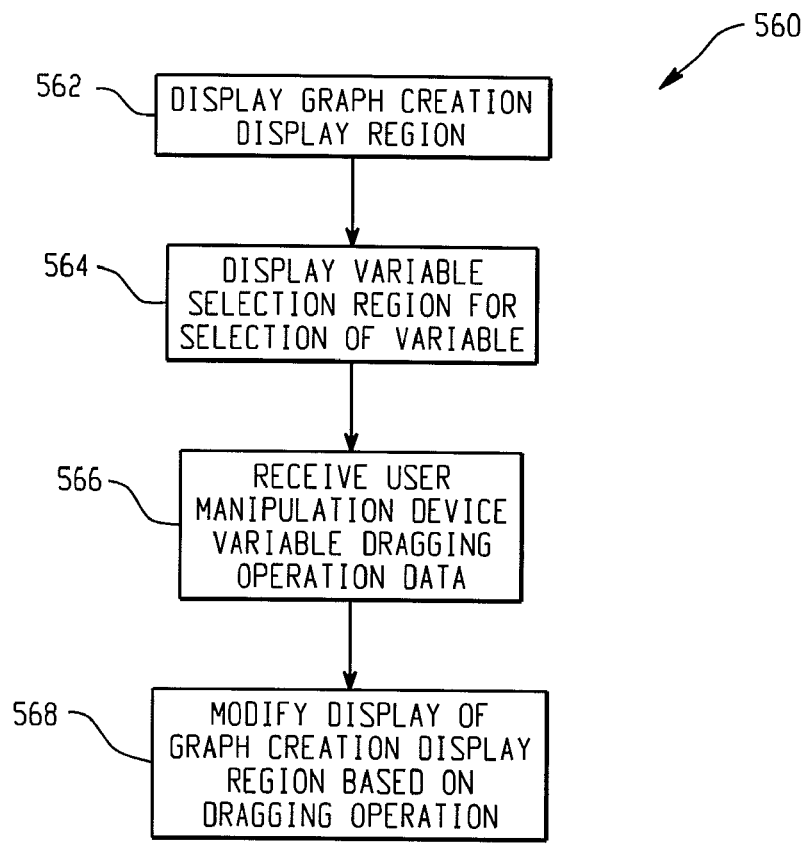
FIG. 40 depicts a computer-implemented method for providing immediate or near real-time graph data feedback to a user during a drag-and-drop graph display creation process.

FIG. 40 depicts a computer-implemented method for providing immediate or near real-time graph data feedback to a user during a drag-and-drop graph display creation process. In the computer-implemented method 560, at 562, a graph creation display region is displayed on a computer-human interface display, the graph creation display region including at least one axis. A graph display data structure is configured to be stored in a computer-readable storage medium and to contain associations between graph display components and variables. The associations contained in the graph display data structure define what graph components are to be displayed on the graph creation display region. At 564, a variable selection region is displayed on the computer-human interface display device for selection via a user manipulation device of a variable to be graphically displayed on the computer-human interface device. The computer-human interface device contains a plurality of graph hotspots, where a graph hotspot is a region on the computer-human interface display that is associated with a graph display component. A user manipulation device is used to drag a variable from the variable selection region, and user manipulation device variable dragging operation data is received at 566. Dragging a variable to a graph hotspot results in a temporary association between the associated graph display component and the dragged variable. While the variable is being dragged over a hotspot, at 568, the display of the graph creation display region on the computer-human interface display device is modified to provide immediate or near real-time feedback to the user of a temporary association between the associated graph display component and the dragged variable.

Figure 41:
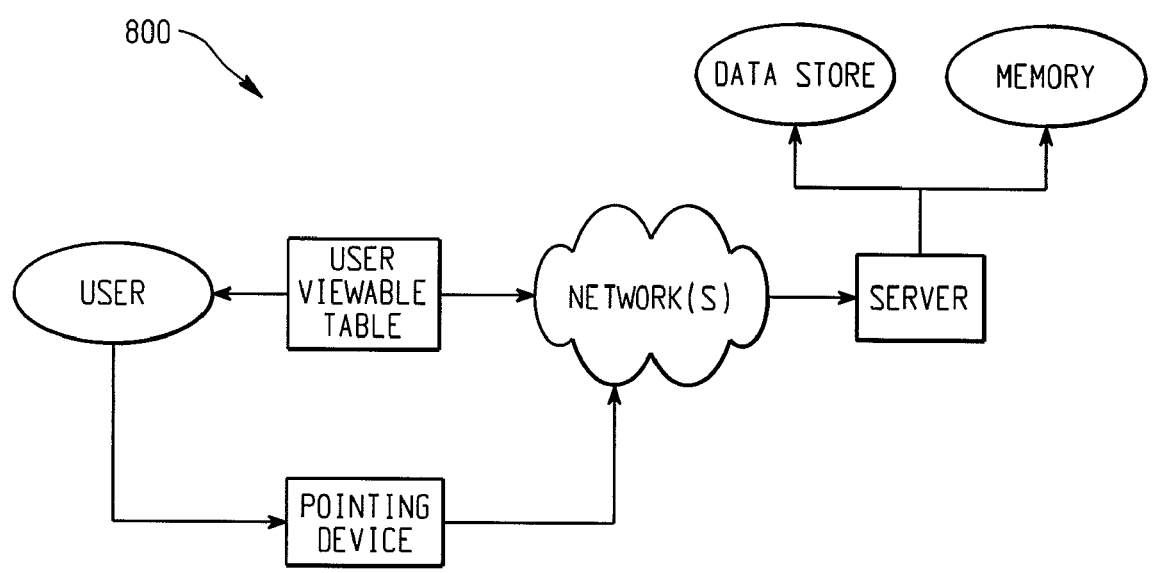
FIG. 41 is a block diagram depicting an environment wherein requesters can interact with a live feedback drag-and-drop graph builder.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting. As an illustration, the systems and methods may be implemented on various types of computer architectures, such as for example on a networked system (as shown at 800 on FIG. 41), or on a single general purpose computer or workstation, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for creating a graph, comprising:
   providing, using one or more data processors, a variable selection region including a variable for display;
   providing, using the one or more data processors, a graph creation region that includes a plurality of graph components for display, wherein at least one graph component is an axis;
   defining, using the one or more data processors, one or more hotspots on the graph creation region, wherein a hotspot covers a portion of the graph creation region;
   associating, using the one or more data processors, a hotspot with a graph component, wherein the hotspot is used to generate an association between the graph component and a variable;
   generating, using the one or more data processors, an association between a variable and the graph component when a particular variable from the variable selection region is dragged onto the hotspot associated with the graph component;
   updating, using the one or more data processors, the graph creation region using the association, wherein the updated graph creation region displays a preview of the association between the particular variable and the graph component;
   confirming, using the one or more data processors, the association between the particular variable and the graph component displayed in the preview, wherein the association is confirmed when the particular variable is dropped onto the hotspot associated with the graph component; and
   using, using the one or more data processors, the confirmed association to redefine the one or more hotspots to include additional available hotspots on the graph creation region.

2. The method of claim 1, wherein one of the hotspots is an axis hotspot, and wherein dragging the particular variable onto the axis hotspot results in the particular variable being plotted on the graph creation region in real-time.

3. The method of claim 2, wherein one of the hotspots is an insert-before hotspot, wherein dragging a second variable onto the insert-before hotspot results in the graph creation region being divided to display an additional row or column of sub-graphs, and wherein the additional sub-graphs plot the second variable on the graph creation region.

4. The method of claim 2, wherein one of the hotspots is a merge hotspot, and wherein dragging a second variable onto the merge hotspot results in the second variable being plotted along an axis associated with the merge hotspot on the graph creation region.

5. The method of claim 1, wherein one of the hotspots is an X group hotspot, and wherein dragging the particular variable onto the X group hotspot results in the graph creation region being divided vertically into a plurality of sub-graphs.

6. The method of claim 5, wherein one of the hotspots is a Y group hotspot, and wherein dragging a second variable onto the Y group hotspot results in the graph creation region being divided horizontally into an additional plurality of sub-graphs.

7. The method of claim 1, wherein updating the graph creation region includes highlighting modifications based upon the association.

8. The method of claim 7, wherein highlighting includes applying a transparent, colored highlighting to the modifications.

9. The method of claim 7, wherein the highlighting is removed when the particular variable is dropped onto the hotspot.

10. The method of claim 1, wherein the updating is reversed when the particular variable is dragged off of the hotspot.

11. The method of claim 1, further comprising:
    determining a first format for plotting data based upon associations between variables and graph components, wherein the first format is used for default plotting.

12. The method of claim 11, further comprising:
    determining an additional plurality of acceptable formats based upon associations between variables and graph components, wherein additional acceptable formats are available for selection.

13. The method of claim 1, wherein the hotspots include at least two of:

an X axis hotspot, a Y axis hotspot, a group X hotspot, a group Y hotspot, an overlay hotspot, an insert before hotspot, an insert after hotspot, a merge hotspot, and an order hotspot.

14. The method of claim 1, wherein generating the association uses an association data structure.

15. The method of claim 14, wherein the association data structure is discarded when the particular variable is dragged off of the hotspot.

16. A system for creating a graph, comprising:
one or more processors;
one or more computer-readable storage mediums containing instructions configured to cause the one or more processors to perform operations including:
providing a variable selection region including a variable for display;
providing a graph creation region that includes a plurality of graph components for display, wherein at least one graph component is an axis;
defining one or more hotspots on the graph creation region, wherein a hotspot covers a portion of the graph creation region;
associating a hotspot with a graph component, wherein the hotspot is used to generate an association between the graph component and a variable;
generating an association between a variable and the graph component when a particular variable from the variable selection region is dragged onto the hotspot associated with the graph component;
updating the graph creation region using the association, wherein the updated graph creation region displays a preview of the association between the particular variable and the graph component;
confirming the association between the particular variable and the graph component displayed in the preview, wherein the temporary association is confirmed when the particular variable is dropped onto the hotspot associated with the graph component; and
using the confirmed association to redefine the one or more hotspots to include additional available hotspots on the graph creation region.

17. A computer-program product for creating a graph, tangibly embodied in a machine-readable storage medium, including instructions configured to cause a data processing apparatus to:
provide a variable selection region including a variable for display;
provide a graph creation region that includes a plurality of graph components, wherein at least one graph component is an axis for display;
define one or more hotspots on the graph creation region, wherein a hotspot covers a portion of the graph creation region;
associate a hotspot with a graph component, wherein the hotspot is used to generate an association between the graph component and a variable;
generate a temporary association between a variable and the graph component when a particular variable from the variable selection region is dragged onto the hotspot associated with the graph component;
update the graph creation region using the temporary association, wherein the updated graph creation region displays a preview of the association between the particular variable and the graph component;
confirm the temporary association between the particular variable and the graph component displayed in the preview, wherein the temporary association is confirmed when the particular variable is dropped onto the hotspot associated with the graph component; and
use the confirmed association to redefine the one or more hotspots to include additional available hotspots on the graph creation region.

* * * * *